United States Patent
Nakazawa et al.

(10) Patent No.: US 10,626,991 B2
(45) Date of Patent: Apr. 21, 2020

(54) SEGMENT, COMBINATION OIL RING, AND MANUFACTURING METHOD FOR A SEGMENT

(71) Applicant: TPR CO., LTD., Tokyo (JP)

(72) Inventors: Atsushi Nakazawa, Tokyo (JP); Hironori Fujita, Tokyo (JP); Yusuke Nishi, Tokyo (JP)

(73) Assignee: TPR CO., LTD., Tokyo (JP)

( * ) Notice: Subject to any disclaimer, the term of this patent is extended or adjusted under 35 U.S.C. 154(b) by 0 days.

(21) Appl. No.: 16/339,118

(22) PCT Filed: Sep. 29, 2017

(86) PCT No.: PCT/JP2017/035589
§ 371 (c)(1),
(2) Date: Apr. 3, 2019

(87) PCT Pub. No.: WO2019/064525
PCT Pub. Date: Apr. 4, 2019

(65) Prior Publication Data
US 2019/0360584 A1    Nov. 28, 2019

(51) Int. Cl.
*F16J 9/06* (2006.01)
*B23K 26/364* (2014.01)
*B21F 37/02* (2006.01)

(52) U.S. Cl.
CPC ............ *F16J 9/068* (2013.01); *B21F 37/02* (2013.01); *B23K 26/364* (2015.10)

(58) Field of Classification Search
CPC ........ F16J 9/06; F16J 9/068; F16J 9/12; F16J 9/067; F16J 9/066; F16J 9/145; F16J 9/203; F16J 9/26; F16J 9/065
See application file for complete search history.

(56) References Cited

U.S. PATENT DOCUMENTS 2,854,301 A * 9/1958 Lutz .................. F16J 9/145
                                                267/1.5
2,904,377 A * 9/1959 Endres .............. F16J 9/068
                                                277/480
(Continued)

FOREIGN PATENT DOCUMENTS

CN    101253352 A    8/2008
CN    103890464 A    6/2014
(Continued)

OTHER PUBLICATIONS

International Search Report and Written Opinion for PCT/JP2017/035589, dated Dec. 12, 2017.
(Continued)

*Primary Examiner* — Eugene G Byrd
(74) *Attorney, Agent, or Firm* — Merchant & Gould P.C.

(57) ABSTRACT

Provided are a segment, a combination oil ring, and a manufacturing method for a segment, which are capable of preventing independent rotation of the segment while dealing with reduction in tension of the combination oil ring. Specifically, provided is a segment being slidable in an axial direction of a cylinder under a state in which an inner peripheral surface of the segment is pressed by ear portions formed in an expander spacer in a circumferential direction and an outer periphery side of the segment is pressed against an inner wall of the cylinder, in which the inner peripheral surface of the segment has at least two or more dross-projecting portions in the circumferential direction, and the dross-projecting portions have a projection height of from 4 µm to 25 µm.

12 Claims, 7 Drawing Sheets

(56) References Cited

U.S. PATENT DOCUMENTS

| | | | | | |
|---|---|---|---|---|---|
| 3,695,622 | A | * | 10/1972 | Davis | F16J 9/063 277/435 |
| 3,759,148 | A | * | 9/1973 | Geffroy | F02F 3/00 92/160 |
| 4,111,437 | A | * | 9/1978 | Saylor | F16J 9/066 277/435 |
| 4,115,959 | A | * | 9/1978 | McCormick | C23C 4/10 51/295 |
| 4,194,747 | A | * | 3/1980 | Nisper | F16J 9/069 267/1.5 |
| 4,429,885 | A | * | 2/1984 | Chiba | F16J 9/068 267/1.5 |
| 4,542,907 | A | * | 9/1985 | Chiba | F16J 9/067 267/1.5 |
| 4,548,416 | A | * | 10/1985 | Maeda | F16J 9/069 267/1.5 |
| 4,759,266 | A | * | 7/1988 | Murray | F16J 9/066 277/480 |
| 4,762,329 | A | * | 8/1988 | Koroki | F16J 9/066 267/1.5 |
| 5,129,661 | A | * | 7/1992 | Ono | F16J 9/066 277/479 |
| 5,161,805 | A | * | 11/1992 | Watanabe | B21D 7/08 277/480 |
| 5,195,758 | A | * | 3/1993 | Erway | F16J 9/066 267/1.5 |
| 5,469,616 | A | * | 11/1995 | Miyazaki | F16J 9/066 29/888.07 |
| 5,718,437 | A | * | 2/1998 | Tanaka | F16J 9/066 277/443 |
| 5,794,941 | A | * | 8/1998 | Lahrman | F16J 9/063 277/441 |
| 7,036,823 | B2 | * | 5/2006 | Takiguchi | F16J 9/064 277/434 |
| 7,044,472 | B2 | * | 5/2006 | Takahashi | F16J 9/067 277/434 |
| 7,854,191 | B2 | * | 12/2010 | Kariya | F16J 9/068 92/160 |
| 8,835,549 | B2 | * | 9/2014 | Gao | C09D 4/00 427/255.14 |
| 9,784,369 | B2 | * | 10/2017 | Fujita | F02F 5/00 |
| 2002/0070507 | A1 | * | 6/2002 | Heraud | F16J 9/062 277/434 |
| 2004/0262847 | A1 | * | 12/2004 | Inoue | C23C 8/02 277/443 |
| 2006/0027976 | A1 | * | 2/2006 | Usui | F16J 9/062 277/434 |
| 2006/0061043 | A1 | * | 3/2006 | Takahashi | F16J 9/068 277/434 |
| 2006/0113730 | A1 | * | 6/2006 | Suzuki | F16J 9/062 277/434 |
| 2006/0169135 | A1 | * | 8/2006 | Usui | F16J 9/068 92/248 |
| 2008/0122185 | A1 | * | 5/2008 | Katou | F16J 9/062 277/443 |
| 2009/0250880 | A1 | | 10/2009 | Ferrarese et al. | |
| 2011/0221141 | A1 | * | 9/2011 | Ayuzawa | F16J 9/068 277/434 |
| 2013/0181410 | A1 | * | 7/2013 | Chiba | F16J 9/062 277/443 |
| 2014/0021686 | A1 | * | 1/2014 | Takahashi | F16J 9/066 277/442 |
| 2014/0062030 | A1 | * | 3/2014 | Hitosugi | F16J 9/068 277/489 |
| 2014/0265149 | A1 | | 9/2014 | Nakazawa et al. | |
| 2015/0240945 | A1 | * | 8/2015 | Favaron | F16J 9/064 277/442 |

FOREIGN PATENT DOCUMENTS

| | | | | |
|---|---|---|---|---|
| JP | 01-78769 | U | | 5/1989 |
| JP | 03-67759 | U | | 7/1991 |
| JP | 04-3163 | U | | 1/1992 |
| JP | 04-362373 | A | | 12/1992 |
| JP | 05-340473 | A | | 12/1993 |
| JP | 06-235461 | A | | 8/1994 |
| JP | H08-226540 | A | | 9/1996 |
| JP | 2001-021038 | A | | 1/2001 |
| JP | 2001-132840 | A | | 5/2001 |
| JP | 2001-248730 | A | | 9/2001 |
| JP | 2003-083450 | A | | 3/2003 |
| JP | 2003194222 | A * | 7/2003 | ............. F16J 9/064 |
| JP | 2006300224 | A * | 11/2006 | ............. F16J 9/068 |
| JP | 2016-056809 | A | | 4/2016 |
| KR | 100304435 | B1 | | 7/2001 |
| KR | 2005-0008136 | A | | 1/2005 |
| KR | 2005-0008137 | A | | 1/2005 |

OTHER PUBLICATIONS

Office Action for Chinese Patent Application No. 201780048003.4, dated Sep. 9, 2019.

* cited by examiner

SEGMENT, COMBINATION OIL RING, AND MANUFACTURING METHOD FOR A SEGMENT

This application is a National Stage of International Patent Application No. PCT/JP2017/035589, filed Sep. 29, 2017, which application is incorporated herein by reference. To the extent appropriate, a claim of priority is made to the above disclosed application.

TECHNICAL FIELD

The present invention relates to a segment, a combination oil ring, and a manufacturing method for a segment.

BACKGROUND

In recent years, for internal combustion engines, in order to achieve low fuel consumption of the engines, there has been a trend toward reduction in tension of a combination oil ring for the purpose of reducing friction. However, as tension of an expander spacer is set lower, two segments (side rails) arranged respectively on an upper side and a lower side apt to perform individual rotation in a circumferential direction. In such rotational motion, when gaps of the upper and lower segments are aligned in an up-and-down direction, oil that remains unscraped is conveyed to an engine combustion chamber due to the presence of the gaps. As a result, there arises a problem in that excessive supply of oil causes increase in oil consumption.

In order to solve such problem, it is required that individual rotation of the segments be prevented. For prevention of such individual rotation, for example, in Patent Literature 1, there is disclosed a configuration in which an inner peripheral surface of a segment in contact with an expander spacer has fine projections and recesses. Moreover, in Patent Literature 2, there is disclosed a configuration in which an inner peripheral surface of a segment has slit portions. Pitches of the slit portions are equal to pitches of ears of an expander spacer, and are equal in interval to a width dimension of the ears.

Moreover, in Patent Literature 3, there is disclosed a configuration in which inclined fine projections and recesses are formed along a contour of an ear in an inner peripheral surface of the segment held in contact with an expander spacer. Moreover, in Patent Literature 4, there is disclosed a configuration in which a plurality of grooves are formed in an inner peripheral surface of a segment by radiating laser to an inner peripheral surface of a wire member of a segment formed into an annular shape. Moreover, in Patent Literature 5, the following configuration is disclosed. That is, a soft metal plating layer is formed on an inner peripheral surface of a side rail. The soft metal plating layer has a micro-Vickers hardness of from 150 to 350 and a film thickness of from 5 μm to 30 μm. Further, a nitriding layer is formed on a surface of an expander spacer.

CITATION LIST

Patent Literature

[PTL 1] JP 01-78769 U
[PTL 2] JP 04-3163 U
[PTL 3] JP 03-67759 U
[PTL 4] JP 2001-248730 A
[PTL 5] JP 06-235461 A

SUMMARY OF INVENTION

Technical Problem

Incidentally, in order to achieve reduction in tension of the combination oil ring, it is required that circularity of a segment be improved in accuracy. However, in order to improve the accuracy of the circularity of the segment, the influence of working stress caused by machine work on an inner periphery of the segment cannot be ignored. Moreover, in addition to the reduction in tension of the combination oil ring, reduction in width of the combination oil ring (reduction in width dimension) is also under proceeding. For the segment which is reduced in width, it is required to pay attention to breakage caused by machine work performed on the inner periphery of the segment. Moreover, as one option, surface treatment may be performed on a surface of the segment. However, surface treatment is disadvantageous in terms of manufacturing cost. In view of demands for reduction in manufacturing cost in recent years, there has been desired a countermeasure against independent rotation of the segment, which is less expensive and satisfies required quality.

In view of those problems, according to the configurations disclosed in Patent Literatures 1 and 2, when a length of the ear portion of the expander spacer is smaller than a pitch of the fine projections and recesses, the rotation of the ear portion cannot be sufficiently stopped because the projections of the fine projections and recesses run on the ear portion. Moreover, with the configurations disclosed in Patent Literatures 1 and 2, when the fine projections and recesses are to be formed on the inner periphery of the segment by machine work, the above-mentioned working stress affects the circularity of the segment.

Moreover, according to the configuration disclosed in Patent Literature 3, the fine projections and recesses having inclination angles along the tangent line of the ear portion are formed. However, the rotation of the ear portion cannot be sufficiently stopped, because the ear portion and the inner periphery of the segment are in point contact, and the projections of the fine projections and recesses run on the ear portion. Moreover, according to Patent Literature 4, grooving is performed on the inner peripheral surface of the segment by laser, and a depth and an interval of the groove are described. However, although the grooves extend along the sliding direction of the segment, the independent rotation of the segment cannot be sufficiently prevented with only such grooves. Moreover, the configuration disclosed in Patent Literature 5 is given to prevent the independent rotation by the surface treatment, but is disadvantageous in terms of manufacturing cost as described above. Moreover, under the circumstance in which the reduction in tension of the combination oil ring is attempted, the surface treatment disclosed in Patent Literature 5 is not sufficient for preventing independent rotation of the segment.

The present invention has been made under the actual circumstances described above, and has an object to provide a segment and a combination oil ring which are capable of preventing independent rotation of a segment while dealing with reduction in tension of the combination oil ring, and to provide a manufacturing method for a segment which is capable of performing in-line processing without increase in the number of steps.

Solution to Problem

In order to solve the above-mentioned problems, according to a first mode of the present invention, there is provided a segment for a combination oil ring for an internal combustion engine, the segment being slidable in an axial direction of a cylinder under a state in which an inner peripheral surface of the segment is pressed by ear portions formed in an expander spacer along a circumferential direction and an outer periphery side of the segment is pressed against an inner wall of the cylinder, in which the inner peripheral surface of at least one segment has a plurality of pairs of dross-projecting portions, and in which the pair of dross-projecting portions has a projection height of from 4 µm to 25 µm from the inner peripheral surface of a root of the dross-projecting portions at least at one position.

According to another aspect of the present invention, in the above-mentioned invention, it is preferred that the pair of dross-projecting portions have a projection height of from 4 µm to 25 µm from the inner peripheral surface of the root of the dross-projecting portions at least at one position among positions of the inner peripheral surface of the segment that is opened within a range of from 10 degrees to 30 degrees with respect to a center axis of a width of the segment.

Further, according to another aspect of the present invention, in the above-mentioned invention, it is preferred that the pairs of dross-projecting portions be formed at two or more positions, and all of the pairs of the dross-projecting portions be formed so as to be inclined in a first inclination direction with respect to a center axis direction orthogonal to a circumferential direction of the segment.

Further, according to another aspect of the present invention, in the above-mentioned invention, it is preferred that the pairs of dross-projecting portions include a pair of dross-projecting portions inclined in a first inclination direction with respect to a center axis direction orthogonal to a circumferential direction of the segment and a pair of dross-projecting portions inclined in a second inclination direction different from the first inclination direction, the pair of dross-projecting portions inclined in the first inclination direction and the pair of dross-projecting portions inclined in the second inclination direction be adjacent to each other at a part other than a gap of the segment, and the adjacent pairs of dross-projecting portions be formed at least at two positions.

Further, according to another aspect of the present invention, in the above-mentioned invention, it is preferred that the pair of dross-projecting portions be continuously formed in a mounded form in a width direction of the segment, and a direction of the dross-projecting portions form an inclination angle of equal to or less than 45 degrees with respect to a center axis direction orthogonal to a circumferential direction of the segment.

Further, according to another aspect of the present invention, in the above-mentioned invention, it is preferred that the pair of dross-projecting portions be formed across a recessed groove.

Further, according to another aspect of the present invention, in the above-mentioned invention, it is preferred that the segment be made of carbon steel or stainless steel as a material.

Further, according to a second mode of the present invention, there is provided a combination oil ring, including: an expander spacer having ear portions along a circumferential direction; and at least one segment being slidable in an axial direction of a cylinder under a state in which an inner peripheral surface of the segment is pressed by the ear portions and an outer periphery side of the segment is pressed against an inner wall of the cylinder, in which the inner peripheral surface of the segment has a plurality of pairs of dross-projecting portions, and in which the pair of dross-projecting portions has a projection height of from 4 µm to 25 µm from the inner peripheral surface of a root of the dross-projecting portions at least at one position.

Further, according to another aspect of the present invention, in the above-mentioned invention, it is preferred that the pair of dross-projecting portions have a projection height of from 4 µm to 25 µm from the inner peripheral surface of the root of the dross-projecting portions at least at one position among positions of the inner peripheral surface of the segment that is opened within a range of from 10 degrees to 30 degrees with respect to a center axis of a width of the segment.

Further, according to another aspect of the present invention, in the above-mentioned invention, it is preferred that the pairs of dross-projecting portions be formed at two or more positions, and all of the pairs of the dross-projecting portions be formed so as to be inclined in a first inclination direction with respect to a center axis direction orthogonal to a circumferential direction of the segment.

Further, according to another aspect of the present invention, in the above-mentioned invention, it is preferred that the pairs of dross-projecting portions include a pair of dross-projecting portions inclined in a first inclination direction with respect to a center axis direction orthogonal to a circumferential direction of the segment and a pair of dross-projecting portions inclined in a second inclination direction different from the first inclination direction, the pair of dross-projecting portions inclined in the first inclination direction and the pair of dross-projecting portions inclined in the second inclination direction be adjacent to each other at a part other than a gap of the segment, and the adjacent pairs of dross-projecting portions be formed at least at two positions.

Further, according to another aspect of the present invention, in the above-mentioned invention, it is preferred that the pair of dross-projecting portions be continuously formed in a mounded form, and a continuing direction of the dross-projecting portions form an inclination angle of equal to or less than 45 degrees with respect to the center axis direction.

Further, according to another aspect of the present invention, in the above-mentioned invention, it is preferred that the pair of dross-projecting portions be formed across a recessed groove.

Further, according to another aspect of the present invention, in the above-mentioned invention, it is preferred that, when a pitch between positions at which the pairs of dross-projecting portions are formable is a pitch P2, and a pitch between the ear portions of the expander spacer is a pitch P1, P2=n×P1 be satisfied with "n" being a positive integer, and the pairs of dross-projecting portions be formed at least at two positions among positions determined by the pitch P2.

Further, according to another aspect of the present invention, in the above-mentioned invention, it is preferred that, when a pitch in a width center of the segment between positions at which the pairs of dross-projecting portions are formable is a pitch P2, and a pitch between the ear portions of the expander spacer is a pitch P1, P2=n×P1+P1/2 be satisfied with "n" being an integer equal to or more than 0, and the pairs of dross-projecting portions be formed at least at two positions among positions determined by the pitch P2.

Further, according to another aspect of the present invention, in the above-mentioned invention, it is preferred that the segment be made of carbon steel or stainless steel as a material.

Further, according to a third mode of the present invention, there is provided a manufacturing method for a segment being slidable in an axial direction of a cylinder under a state in which an inner peripheral surface of the segment is pressed by ear portions formed in an expander spacer along a circumferential direction and an outer periphery side of the segment is pressed against an inner wall of the cylinder, the manufacturing method including: a wire member feeding step of drawing out a wire member from a coil master around which the wire member being a material for the segment is wound, and feeding the wire member toward a downstream side; a laser light radiating step of radiating laser light to the wire member on a downstream side in a feeding direction of the wire member with respect to the coil master, to thereby form a pair of dross-projecting portions in synchronization with a feeding speed of the wire member, the pair of dross-projecting portions having a projection height of from 4 µm to 25 µm from a surface being the inner peripheral surface of a root of the dross-projecting portions at least at one position and being arrayed at three or more positions at equal intervals per length which is a sum of a cutting width given at the time of forming a gap of the segment on a downstream side as a length in a circumferential direction and a circumferential length of one segment; a coiling step of plastically processing the wire member into an annular shape on a downstream side with respect to the laser light radiating step; and a cutting step of cutting the wire member plastically processed into the annular shape and wound into a spiral shape along an axial direction of a wound body obtained by winding the wire member, to thereby form the gap of the segment.

Further, according to another aspect of the present invention, in the above-mentioned invention, it is preferred that the laser light radiating step include radiating the laser light along an intersecting direction intersecting the feeding direction of the wire member in the wire member feeding step, and radiating the laser light only in one direction from one side to another side in the intersecting direction.

Further, according to another aspect of the present invention, in the above-mentioned invention, it is preferred that the laser light radiating step include radiating the laser light along an intersecting direction intersecting the feeding direction of the wire member in the wire member feeding step, and radiating the laser light in two directions in reciprocation in the intersecting direction.

Advantageous Effects of Invention

According to the present invention, the segment and the combination oil ring which prevent the independent rotation of the segment are provided while dealing with reduction in tension of the combination oil ring, and the manufacturing method for a segment which performs in-line processing without increase in the number of steps is provided.

BRIEF DESCRIPTION OF DRAWINGS

FIG. 9 are each a side view for illustrating the segment having a plurality of pairs of dross-projecting portions and recessed grooves, in which

DESCRIPTION OF EMBODIMENTS

Now, a combination oil ring 10 according to one embodiment of the present invention is described with reference to the drawings.

<Configuration of Combination Oil Ring 10>

Figure 1:
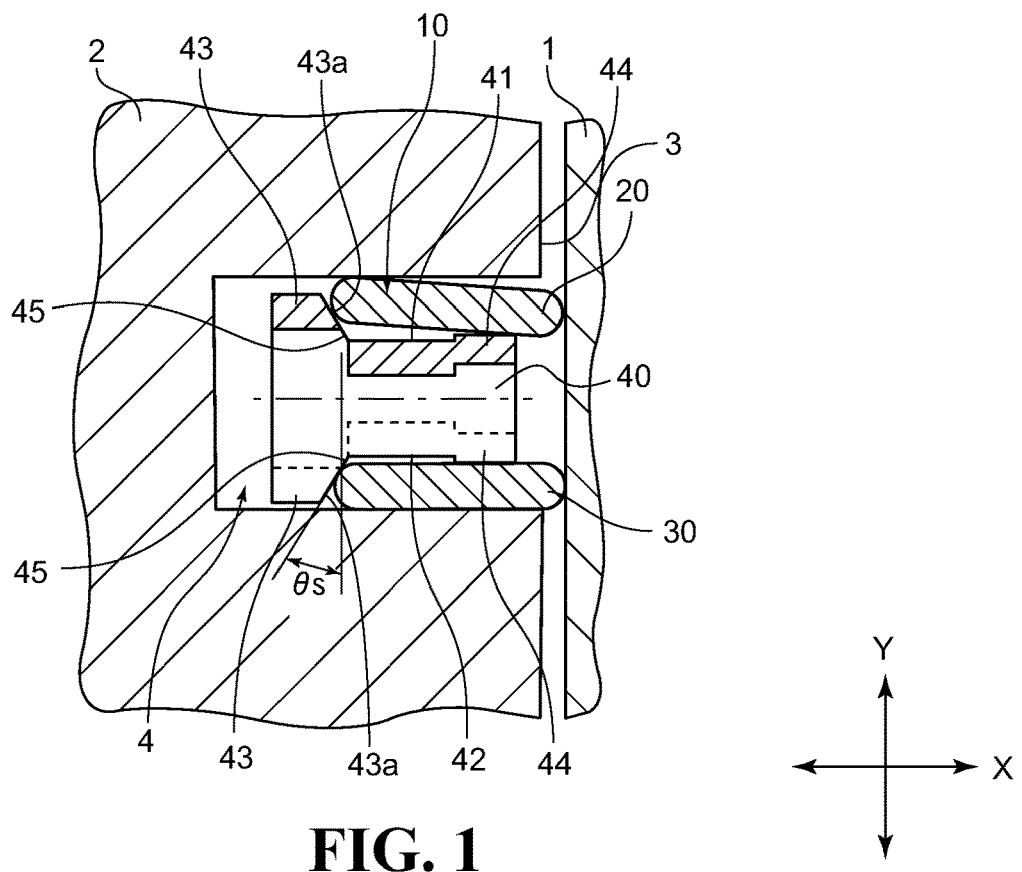
FIG. 1 is a vertical sectional view for illustrating a configuration of a combination oil ring according to one embodiment of the present invention, and is an illustration of a state in which a piston having the combination oil ring mounted thereto is inserted into a cylinder.

FIG. 1 is a vertical sectional view for illustrating a configuration of the combination oil ring 10, and is an illustration of a state in which a piston 2 having the combination oil ring 10 mounted thereto is inserted into a cylinder 1.

In FIG. 1, the piston 2 which is reciprocable is arranged inside the cylinder 1 of an engine of, for example, an automobile. A piston outer peripheral surface 3 of the piston 2 has two or three annular grooves (one or two upper grooves are not shown). Among those annular grooves, an oil ring groove 4 is formed on a crankshaft side (not shown) which is most away from an engine combustion chamber. The combination oil ring 10 is mounted to the oil ring groove 4. Outer peripheral surfaces of segments of the combination oil ring 10 slide on an inner wall of the cylinder 1 so that the combination oil ring 10 exerts an oil-control function.

As illustrated in FIG. 1, the combination oil ring 10 is a combination oil ring of a three-piece type, and is made of steel as a main component. Stainless steel and carbon steel may be given as representative examples of steel, but steel other than those steels may be used. As illustrated in FIG. 1, the combination oil ring 10 includes a pair of segments 20 and 30 and an expander spacer 40 arranged between the pair of segments 20 and 30.

In the following description, in some cases, the engine combustion chamber side in an axial direction (Y-direction) of the cylinder 1 is referred to as "upper side", and in contrast, a side away from the engine combustion chamber is referred to as "lower side".

Figure 2:
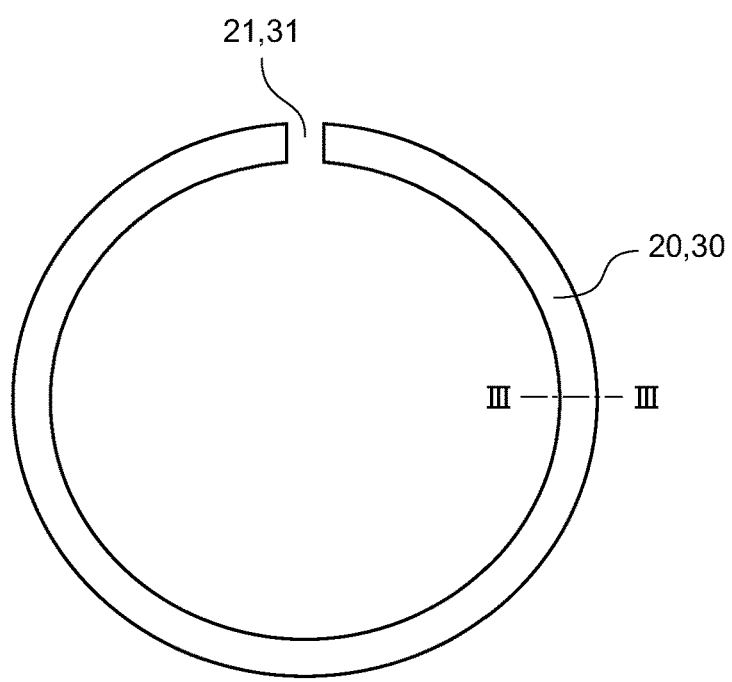
FIG. 2 is a plan view for illustrating an outer appearance of each of segments.
Figure 3:
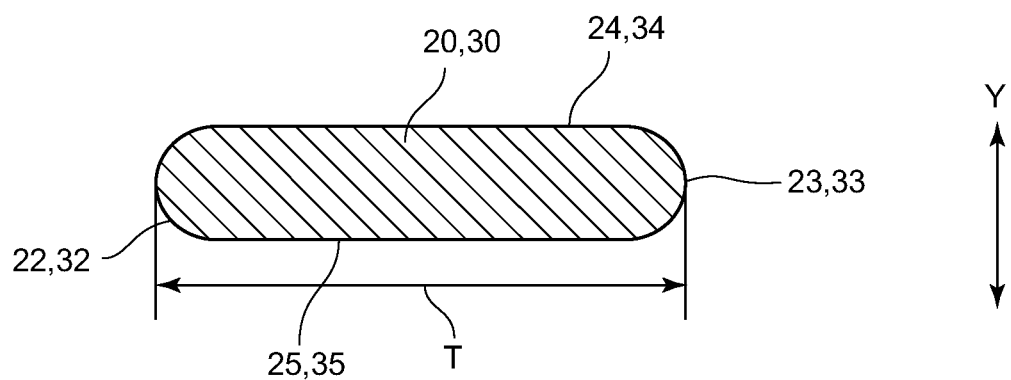
FIG. 3 is a vertical sectional view for illustrating each of the segments taken along the line A-A of FIG. 2.

FIG. 2 is a plan view for illustrating an outer appearance of the segment 20, 30. FIG. 3 is a vertical sectional view for illustrating a state in which the segment 20, 30 is taken along the line A-A of FIG. 2. As illustrated in FIG. 2, the segment 20, 30 has an annular outer appearance. End surfaces of the segment 20, 30 in the circumferential direction are opposed to each other with a small gap at a gap 21, 31. Moreover, the segment 20, 30 has an inner peripheral surface 22, 32, an outer peripheral surface 23, 33, an upper surface 24, 34, and a lower surface 25, 35.

The inner peripheral surface 22, 32 is a portion to be brought into contact with ear portions 43 of the expander spacer 40 illustrated in FIG. 1. Meanwhile, the outer peripheral surface 23, 33 is a portion to be brought into contact with an inner wall surface of the cylinder 1 illustrated in FIG. 1. The inner peripheral surface 22, 32 and the outer peripheral surface 23, 33 are formed between the upper surface 24, 34 and the lower surface 25, 35. The upper surface 24, 34 is a flat portion located on an upper side (engine combustion chamber side) of the segment 20, 30, and the lower surface 25, 35 is a flat portion located on a lower side (side away from the engine combustion chamber side) of the segment 20, 30.

Figure 4:
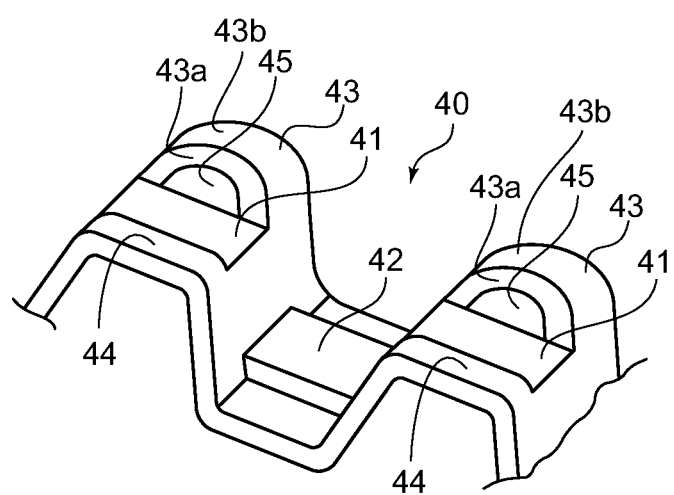
FIG. 4 is a perspective view for illustrating a configuration of an expander spacer.

FIG. 4 is a perspective view for illustrating a configuration of the expander spacer 40. As illustrated in FIG. 4, the expander spacer 40 includes upper pieces 41, lower pieces 42, ear portions 43, and segment support portions 44. The upper pieces 41 are each a horizontal portion which is located at an engine combustion chamber side in the axial direction (Y-direction) of the cylinder 1. Moreover, the lower pieces 42 are each a horizontal portion which is located at a side away from the engine combustion chamber in the axial direction (Y-direction) of the cylinder 1.

Moreover, the ear portions 43 are positioned on an inner periphery side in a radial direction with respect to the upper pieces 41 and the lower pieces 42. Some ear portions 43 project toward the upper side (engine combustion chamber side) from the upper pieces 41, and some ear portions 43 project toward the lower side (side away from the engine combustion chamber) from the lower pieces 42. The ear portions 43 each have an inclination surface 43a, and the inclination surface 43a is inclined with respect to the axial direction (Y-direction) of the cylinder 1 and is oriented toward an outer periphery side. Moreover, the shape of the inclination surface 43a in front view corresponds to a part of a corrugated shape. A portion surrounded by the inclination surface 43a and the upper piece 41 or the lower pieces 42 defines a communication hole 45 which allows oil to flow therethrough.

The inner peripheral surface 22, 32 of the segment 20, 30 is brought into abutment against a part of the inclination surface 43a mentioned above, and such abutment applies an urging force toward the radially outer side (inner wall side of the cylinder 1) to the segment 20, 30. Moreover, the ear portions 43 each also have an ear side surface 43b.

dross-projecting portions 26, 36 described later are brought into abutment against a boundary portion of the ear side surface 43b with respect to the inclination surface 43a. With this, the independent rotation of the segment 20, 30 can be prevented.

Figure 5:
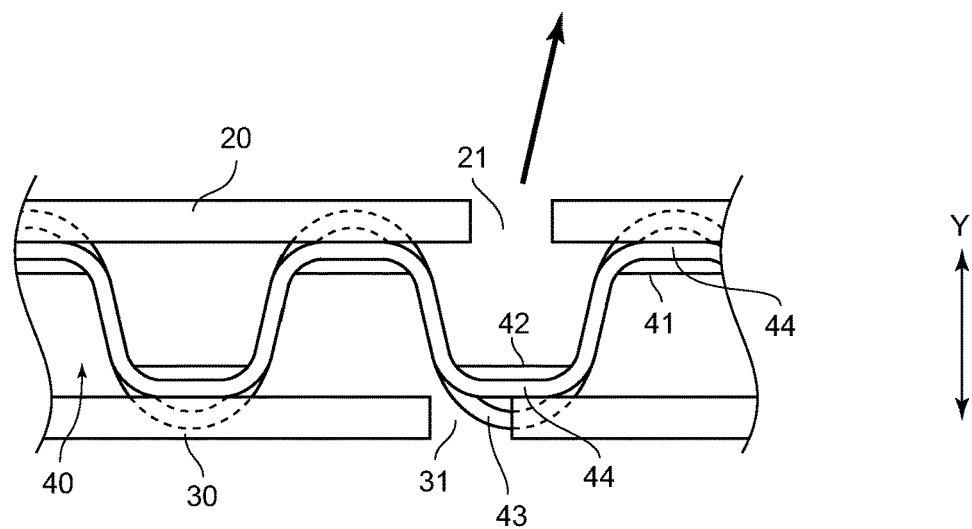
FIG. 5 is an illustration of a state in which gaps of the segments are aligned in an axial direction of the cylinder.

FIG. 5 is an illustration of a state in which the gap 21 of the segment 20 and the gap 31 of the segment 30 are located at positions of overlapping each other in the axial direction (Y-direction) of the cylinder 1. As illustrated in FIG. 5, when the gap 21 of the segment 20 and the gap 31 of the segment 30 are located at positions of overlapping each other in the up-and-down direction (Y-direction), for example, at the time of negative pressure of the engine cylinder internal pressure, oil that remains unscraped by the segments 20 and 30 and the like is sucked toward a side of a compression ring arranged in the engine combustion chamber as indicated by the arrow in FIG. 5. Further, the oil passes through the compression ring and is lost in the engine combustion chamber, with the result that the amount of oil consumption is increased.

In order to solve such problem, according to this embodiment, so-called independent rotation involving rotation of the segments 20 and 30 in the circumferential direction is prevented. In this embodiment, the inner peripheral surface 22, 32 of the segment 20, 30 has a pair of dross-projecting portions 26, 36, and the independent rotation of the segment 20, 30 is prevented by the presence of the dross-projecting portions 26, 36.

Figure 6:
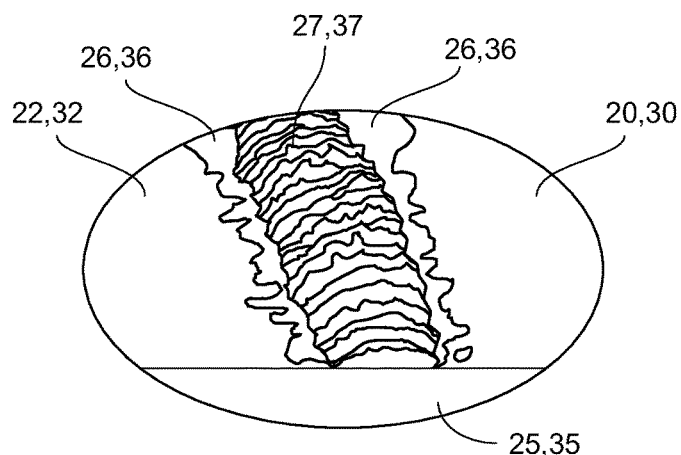
FIG. 6 is a partial perspective view for illustrating, in an enlarged manner, shapes of a pair of dross-projecting portions and a recessed groove.
Figure 7:
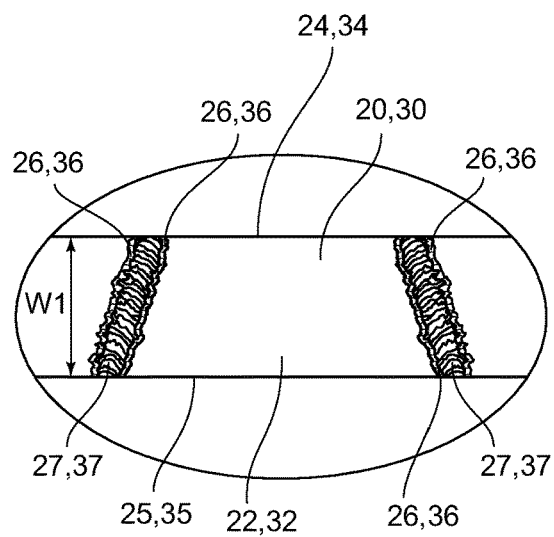
FIG. 7 is a side view for illustrating a state in which the pair of dross-projecting portions and the recessed groove are formed on an inner periphery side of the segment, as seen from an inner peripheral surface side.
Figure 8:
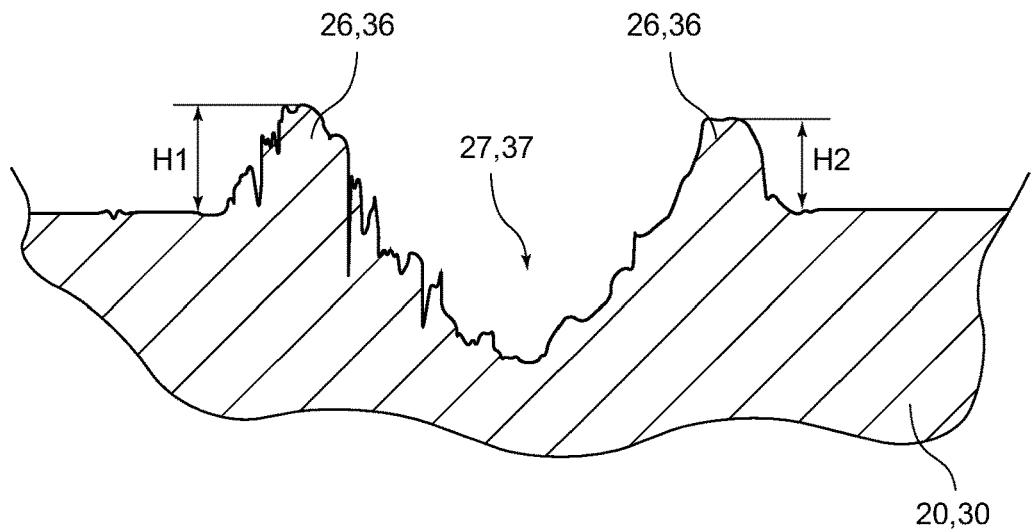
FIG. 8 is a sectional view for illustrating the shapes of the pair of dross-projecting portions and the recessed groove, the shapes being taken transversely along a circumferential direction of the segment.
Figure 9A:
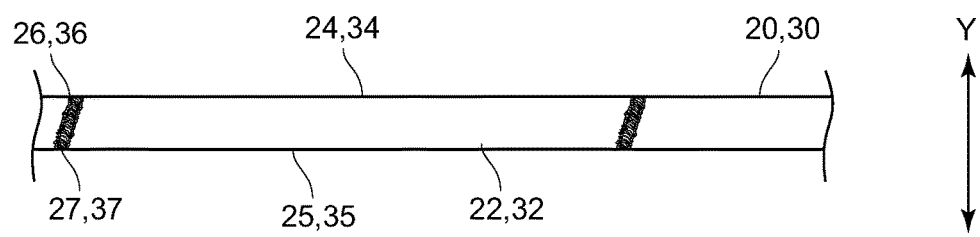
FIG. 9(A) is an illustration of the dross-projecting portions and recessed grooves having only one type of inclination orientation that inclines in a direction toward an engine combustion chamber side as seen clockwisely along the segment.
Figure 9B:
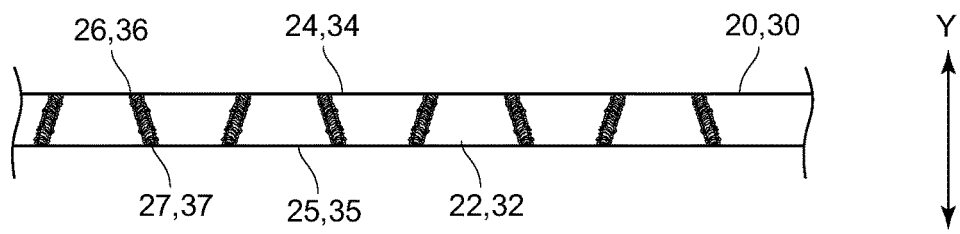
FIG. 9(B) is an illustration of the dross-projecting portions and recessed grooves having two types of inclination orientation including the inclination orientation that inclines in a direction toward the engine combustion chamber side and the inclination orientation that inclines in a direction away from the engine combustion chamber as seen clockwisely along the segment.

FIG. 6 is a partial perspective view for illustrating, in an enlarged manner, shapes of the pair of dross-projecting portions 26, 36 and a recessed groove 27, 37. In FIG. 6, illustration is given of a state in which the lower surface 25, 35 is located at a position on a near side of the drawing sheet, but the upper surface 24, 34 may be located at the position on the near side of the drawing sheet. FIG. 7 is a side view for illustrating a state in which the pair of dross-projecting portions 26, 36 and the recessed groove 27, 37 are formed on the inner periphery side of the segment 20, 30, as seen from the inner peripheral surface side. FIG. 8 is a sectional view for illustrating the shapes of the dross-projecting portions 26, 36 and the recessed groove 27, 37 taken transversely along the circumferential direction (X-direction) of the segment 20, 30. FIG. 9 are each a side view for illustrating the segment 20, 30 having a plurality of dross-projecting portions 26, 36 and the recessed grooves 27, 37. FIG. 9(A) is an illustration of the dross-projecting portions 26, 36 and the recessed grooves 27, 37 having only one type of inclination orientation that inclines in a direction toward the engine combustion chamber side as seen clockwisely along the inner peripheral surface of the segment 20, 30, and being separated apart with large intervals. FIG. 9(B) is an illustration of the dross-projecting portions 26, 36 and the recessed grooves 27, 37 having two types of inclination orientation including the inclination orientation that inclines in a direction toward the engine combustion chamber side and the inclination orientation that inclines in a direction away from the engine combustion chamber as seen clockwisely along the inner peripheral surface of the segment 20, 30.

As illustrated in FIG. 6 to FIG. 8, the dross-projecting portions 26, 36 are formed on both sides of the recessed groove 27, 37. That is, the dross-projecting portions 26, 36 which continue in a mounded form are formed on both sides along the recessed groove 27, 37. As described above, the dross-projecting portions 26, 36 are formed on both sides of the recessed groove 27, 37, and hence a pair of dross-projecting portions 26, 36 are present for each recessed groove 27, 37.

<Projection Height of Dross-Projecting Portions>

Figure 10:
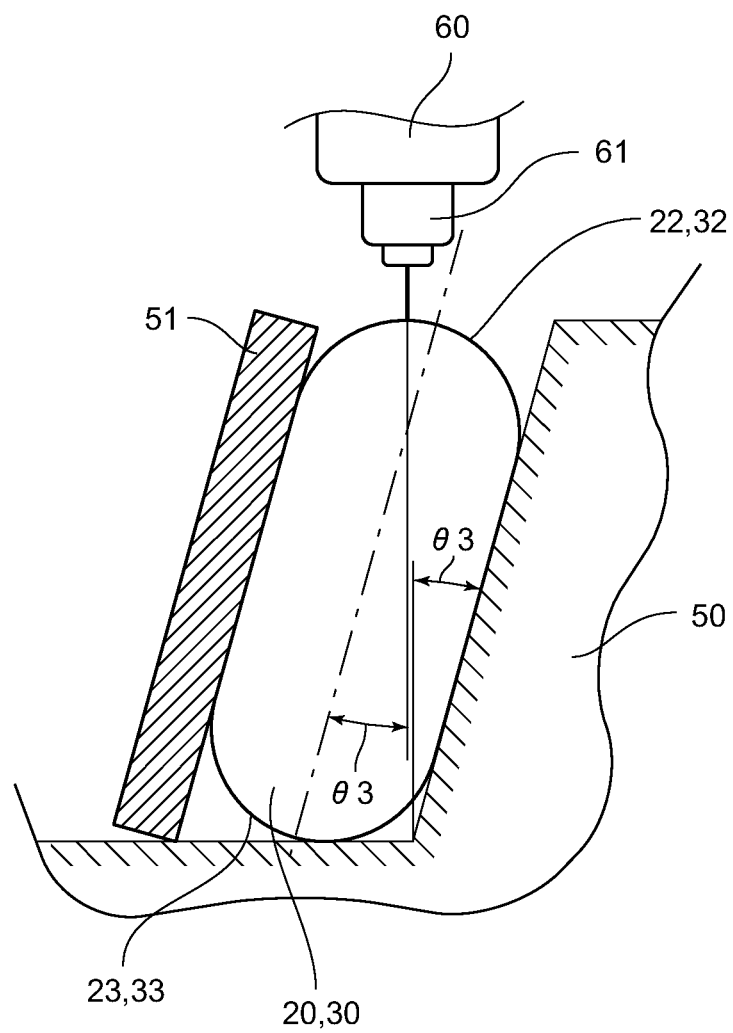
FIG. 10 is an illustration of an image of measuring a projection height of the dross-projecting portions at a position of being inclined by 20 degrees with respect to a radial direction (Y-direction) of the cylinder.

The pair of dross-projecting portions 26, 36 project within a range of from 4 µm to 25 µm with respect to the inner peripheral surface 22, 32 as root portions thereof. FIG. 10 is an illustration of an image of measuring a projection height of the dross-projecting portions 26, 36 at a position on the inner peripheral surface of the segment 20, 30 that is opened by 20 degrees with respect to a center axis of a width of the segment 20, 30. As illustrated in FIG. 10, the projection height of the dross-projecting portions 26, 36 is measured at the position on the inner peripheral surface of the segment 20, 30 that is opened by 20 degrees with respect to the center axis of the width of the segment 20, 30, and the projection height at the above-mentioned position is set within the range of from 4 μm to 25 μm.

In this measurement, the segment 20, 30 is placed with a placement jig 50 which is capable of placing the segment 20, 30 under a state in which the segment 20, 30 is opened by 20 degrees with respect to the center axis of the width of the segment 20, 30 (θ3 in FIG. 10 corresponds to an opening angle of 20 degrees), and measurement is performed under a state in which the segment 20, 30 is sandwiched between a holding member 51 and the placement jig 50. Moreover, the measurement of the projection height of the segment 20, 30 is performed using a surface roughness measurement device 60 including a laser radiation portion 61. In this measurement, measurement is performed by radiating laser light from the laser radiation portion 61 at a top position of the segment 20, 30 that is a highest position in the vertical direction.

Moreover, as illustrated in FIG. 8, when H1 represents a projection height of the dross-projecting portion 26, 36 on the left side across the recessed groove 27, 37, and H2 represents a projection height of the dross-projecting portion 26, 36 on the right side across the recessed groove 27, 37, an average height of the projection heights H1 and H2 is defined as a projection height of the pair of dross-projecting portions 26, 36.

The dross-projecting portions 26, 36 having such projection height are brought into abutment against a boundary portion between the ear side surface 43b and the inclination surface 43a, to thereby prevent the independent rotation of the segment 20, 30. However, the projection height of the dross-projecting portions 26, 36 is not limited to the above-mentioned range as long as the independent rotation of the segment 20, 30 can be prevented. As long as inclination angles, which are described later, of the dross-projecting portions 26, 36 and the recessed groove 27, 37 is small, the projection height may be smaller than 4 μm or larger than 25 μm. Meanwhile, the projection height beyond 25 μm may disadvantageously affect the deformation or distortion of the segment 20, 30, and is not preferable.

In this embodiment, when laser light is irradiated on the inner peripheral surface 22, 32, the irradiated part is melted to form the recessed groove 27, 37. Protruding dross is formed on both sides of the recessed groove 27, 37 as the melted metal is cooled and solidified. The protruding dross corresponds to each of the dross-projecting portions 26, 36. Thus, unlike a cutting burr which is formed at the time of cutting process, the dross-projecting portion 26, 36 has no thin and sharp portion, and has a gently-sloping mounded (hill-like) shape. Thus, unlike a cutting burr, the dross-projecting portion 26, 36 is less liable to drop off even when any impact is applied thereto. Therefore, at the time of independent rotation of the segment 20, 30, the dross-projecting portions 26, 36 are less liable to drop off in the cylinder 1. Moreover, unlike the cutting burr which is formed at the time of cutting process, the dross-projecting portion 26, 36 has no thin and sharp portion, and has the gently-sloping mounded (hill-like) shape, and hence the dross-projecting portion 26, 36 is prevented from serving as a starting point for breakage in the segment 20, 30 reduced in width.

<Inclination Angles of Dross-Projecting Portions and Recessed Groove>

Moreover, as illustrated in FIG. 9(A) and FIG. 9(B), the extending direction of the dross-projecting portions 26, 36 and the recessed groove 27, 37 is parallel to or inclined with respect to a center axis direction (Y-direction) which is orthogonal to the circumferential direction of the segment 20, 30. The extending direction is set so as to have an angle of 45 degrees or less with respect to the center axis direction (Y-direction).

Figure 11:
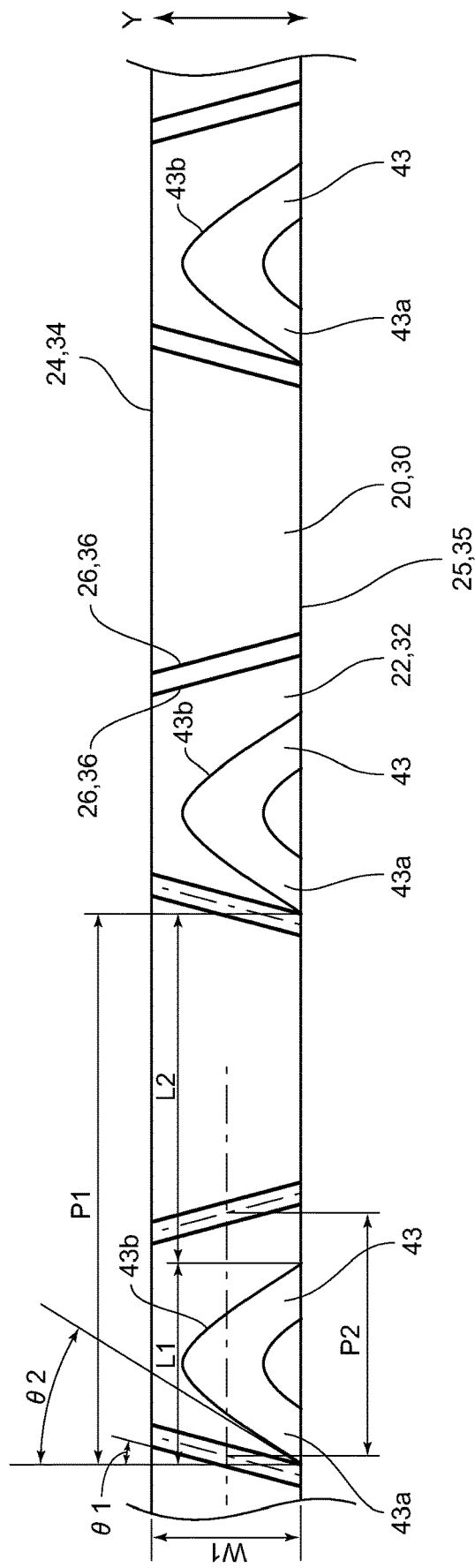
FIG. 11 is an illustration of pitches of ear portions and the dross-projecting portions.

As illustrated in FIG. 11, most of the ear side surfaces 43b of the ear portions 43 of the expander spacer 40 do not extend along but are inclined with respect to the center axis direction (Y-direction). Therefore, it is preferred that the extending direction of the dross-projecting portions 26, 36 and the recessed groove 27, 37 be inclined within the range of 45 degrees or less. For example, when an inclination angle of the above-mentioned extending direction with respect to the center axis direction (Y-direction) is defined as an inclination angle θ1, it is preferred that the inclination angle θ1 be set smaller than an inclination angle θ2 of a ridge line of the ear portion 43 near a part at which the ear portion 43 and the segment inner peripheral surface are brought into contact with each other. However, the inclination angle θ1 and the inclination angle θ2 may be equal each other.

Moreover, as seen clockwisely along the inner peripheral surface of the segment 20, 30 in FIG. 9(B), the dross-projecting portions 26, 36 and the recessed grooves 27, 37 have two types of inclination orientation including the inclination orientation that is inclined in the direction toward the engine combustion chamber side and the inclination orientation that is inclined in the direction away from the engine combustion chamber. However, the dross-projecting portions 26, 36 and the recessed grooves 27, 37 may have only one type of inclination orientation that is inclined in the direction toward the engine combustion chamber side (see FIG. 9(A)) or that is inclined in the direction away from the engine combustion chamber.

That is, as illustrated in FIG. 9(A), all of the dross-projecting portions 26, 36 and all of the recessed grooves 27, 37 may be inclined only in a first inclination direction with respect to the center axis direction (Y-direction) which is orthogonal to the circumferential direction of the segment 20, 30. Moreover, as illustrated in FIG. 9(B), the dross-projecting portions 26, 36 and the recessed grooves 27, 37 may have two types of inclination orientation including the inclination orientation that is inclined in the first inclination direction with respect to the center axis direction (Y-direction) which is orthogonal to the circumferential direction of the segment 20, 30 and the inclination orientation that is inclined in a second inclination direction which is different from the first inclination direction. In the configuration illustrated in FIG. 9(B), the dross-projecting portions 26, 36 inclined in the first inclination direction and the dross-projecting portions 26, 36 inclined in the second inclination direction are adjacent to each other at portions other than the gap 21, 31, and are formed at least at two positions in the circumferential direction of the segment 20, 30. At portions on both sides of the gap 21, 31, the dross-projecting portions 26, 36 inclined in the first inclination direction and the dross-projecting portions 26, 36 inclined in the second inclination direction may be adjacent to each other or may be not adjacent to each other.

The first inclination direction of the dross-projecting portions 26, 36 and the recessed groove 27, 37 includes the following inclination direction. That is, the inclination direction that is given when the dross-projecting portions 26, 36 and the recessed groove 27, 37 are inclined toward one side (upper side in FIG. 9(A) and FIG. 9(B)) in the center axis direction (Y-direction) as seen along the circumferential direction of the segment 20, 30 corresponds to the first inclination direction. The inclination angle of the first inclination direction may differ among the plurality of dross-projecting portions 26, 36 and the plurality of recessed grooves 27, 37 as long as the inclination angle is 45 degrees or less with respect to the center axis direction (Y-direction) as described above. Moreover, the inclination direction that is given when the dross-projecting portions 26, 36 and the recessed groove 27, 37 are inclined toward another side (lower side in FIG. 9(B)) in the center axis direction (Y-direction) as seen along the circumferential direction of the segment 20, 30 corresponds to the second inclination direction. The inclination angle of the second inclination direction may differ among the plurality of dross-projecting portions 26, 36 and the plurality of recessed grooves 27, 37 as long as the inclination angle is 45 degrees or less with respect to the center axis direction (Y-direction) as described above. As long as the independent rotation of the segment 20, 30 can be prevented, the inclination angle in the first inclination direction and the inclination angle in the second inclination direction are not limited to the range of 45 degrees or less described above, and may be an angle larger than 45 degrees.

In the configuration illustrated in FIG. 9(B) and FIG. 9(A), the dross-projecting portions 26, 36 and the recessed grooves 27, 37 have a straight shape. However, the dross-projecting portions 26, 36 and the recessed groove 27, 37 may have a curved shape. For example, when the dross-projecting portions 26, 36 and the recessed grooves 27, 37 are to be formed through laser irradiation to the inner peripheral surface 22, 32, the laser light may be radiated so as to draw sinusoidal waves, other curves, or a combination of a curved line including the sinusoidal waves and a straight line.

Moreover, in the configuration illustrated in FIG. 7 and FIG. 9(B), the dross-projecting portions 26,36 may include two types of inclination as seen from the lower side to the upper side in the center axis direction (Y-direction), that is, the inclination in the clockwise direction and the inclination in the counterclockwise direction, but may have a configuration in which only one of the inclination in the clockwise direction and the inclination in the counter clockwise direction is present. Moreover, the dross-projecting portions 26, 36 having a plurality of types of inclination angles may be formed on the inner peripheral surface 22, 32.

<Pitch of Dross-Projecting Portions>

Next, a pitch of the pair of dross-projecting portions 26, 36 formed on the inner peripheral surface 22, 32 will be described. When a pitch of the dross-projecting portions 26, 36 is to be determined, it is desired that the dross-projecting portions 26, 36 be prevented from riding over the inclination surface 43a of the ear portion 43 (prevented from being held in abutment at a part other than the boundary of the inclination surface 43a). That is, it is desired that the dross-projecting portions 26, 36 be positioned in a space between adjacent ear portions 43.

In a case in which the ear portion 43 (inclination surface 43a) presses the segment 20, 30 toward the outer periphery side under a state in which the dross-projecting portions 26, 36 do not ride over the ear portion 43 (inclination surface 43a), even when the independent rotation of the segment 20, 30 occurs, the boundary portion between the ear side surface 43b and the inclination surface 43a collides with the dross-projecting portions 26, 36. With this, the independent rotation of the segment 20, 30 can be prevented.

Three or more pairs of dross-projecting portions 26, 36 are provided at equal intervals per length which is a sum of a circumferential length of one segment 20, 30 and a cutting width given in a cutting process for the gap on the downstream side. When the dross-projecting portions 26, 36 illustrated in FIG. 9(A) are formed, a pitch P2 of the dross-projecting portions 26, 36 and a pitch P1 of the ear portions 43 (inclination surfaces 43a) of the expander spacer 40 have a relationship satisfying both Expression 1 and Expression 2.

$$P1 \leq P2 \leq \pi(D-2T)/3 \qquad \text{(Expression 1)}$$

$$P2 = n \times P1 \qquad \text{(Expression 2)}$$

In the expressions, D represents an outer diameter of the segment 20, 30 (inner diameter of the cylinder 1), and T represents a thickness of the segment 20, 30 in a radial direction. Moreover, "n" represents positive integers such as 1, 2, and 3.

Meanwhile, when the dross-projecting portions 26, 36 illustrated in FIG. 9(B) are formed, the pitch P2 of the dross-projecting portions 26, 36 and the pitch P1 of the ear portions 43 (inclination surfaces 43a) of the expander spacer 40 have a relationship satisfying all of Expression 3, Expression 4, and Expression 5. However, in this case, the pitch P2 is defined as a pitch measured at centers of a width of the segment 20, 30.

$$L1 \leq -P\tfrac{1}{2} \qquad \text{(Expression 3)}$$

$$P\tfrac{1}{2} \leq P2 \leq \pi(D-2T)/6 \qquad \text{(Expression 4)}$$

$$P2 = n \times P1 + P\tfrac{1}{2} \qquad \text{(Expression 5)}$$

Also in Expression 5, "n" represents integers such as 0, 1, 2, and 3 (in FIG. 9(B), P2 in a case of n=0 is given).

The expander spacer 40 is formed by coiling a wire member having the ear portions 43, cutting the same into segment each having a predetermined length, and joining one end and another end of the segment. In a manufacturing step thereof, in actuality, the ear portion 43 on the upper piece 41 side is cut off so that the number of ear portions 43 on the upper piece 41 side becomes smaller by one than the number of ear portions 43 on the lower piece 42 side. In contrast, the ear portion 43 on the lower piece 42 side may be cut off so that the number of the ear portions 43 on the lower piece 42 side becomes smaller by one than the number of the ear portions 43 on the upper piece 41 side.

When the number of the ear portions 43 on the upper piece 41 side becomes smaller by one than the number of the ear portions 43 on the lower piece 42 side, a distance between the ear portions 43 at a part including the cut part of the ear portion 43 is not equal to the pitch P1 and deviates therefrom. In such a case, even when Expression 1 and Expression 2 described above are satisfied (case illustrated in FIG. 9(A)), or Expression 3, Expression 4, and Expression 5 are satisfied (case illustrated in FIG. 9(B)), the dross-projecting portions 26, 36 may ride over the ear portion 43. This similarly applies to the case in which the ear portion 43 on the lower piece 42 side is cut off so that the number of the ear portions 43 on the lower piece 42 side becomes smaller by one than the number of the ear portions 43 on the upper piece 41 side.

As a countermeasure to this, when Expression 1 and Expression 2 described above are satisfied (case illustrated in FIG. 9(A)), and when Expression 3, Expression 4, and Expression 5 are satisfied (case illustrated in FIG. 9(B)), the dross-projecting portions 26, 36 are not formed at all of positions of the pitch P2 determined as described above, and a part having no dross-projecting portions 26, 36 (such part is hereinafter referred to as "clearance part") is formed at least at one of the positions of the pitch P2. As a result, when a part including the cut part of the ear portion 43 described above is positioned at the clearance part, the dross-projecting portions 26, 36 can reliably be prevented from riding over the ear portions 43.

<Film on Dross-Projecting Portions>

Moreover, a film may be formed on the inner peripheral surface 22, 32 side of the segment 20, 30. The film may be formed by, for example, phosphating process, gas nitriding layer, or salt bath nitriding process. However, the film may be formed by other methods. Even when such film is formed, a projection height of the dross-projecting portions 26, 36 is desirably within the range of from 4 μm to 25 μm described above.

<Manufacturing Method for Segment>

Now, a manufacturing method for the segment 20, 30 having the pairs of dross-projecting portions 26, 36 and the recessed grooves 27, 37 will be described.

Figure 12:
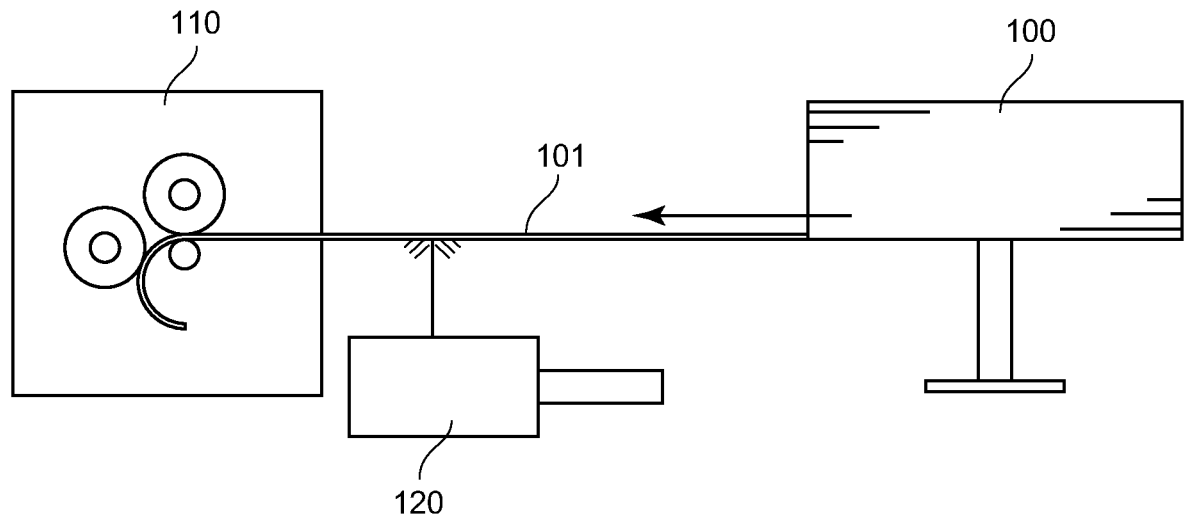
FIG. 12 is an illustration of an image of a manufacturing method for the segment.

FIG. 12 is an illustration of an image of the manufacturing method for the segment 20, 30 from a wire member feeding step to a coiling step. As illustrated in FIG. 12, when the segment 20, 30 is to be manufactured, a wire member 101 is fed from a coil master 100 (corresponding to the wire member feeding step). At this time, the wire member 101 is fed toward a coiling device 110. The coil master 100 is a part around which the wire member 101 is wound. Moreover, the wire member 101 is a material for the segment 20, 30.

A laser light radiation device 120 is provided between the coil master 100 and the coiling device 110 described later. Laser light is radiated to the wire member 101 with use of the laser light radiation device 120 to form a pair of dross-projecting portions 26, 36 at portions corresponding to the inner peripheral surface 22, 32 of the segments 20, 30 (corresponding to a laser light radiating step). The laser light radiation device 120 is a device which is configured to radiate laser light to the inner peripheral surface 22, 32 of the segment 20, 30. For example, when the wire member 101 is fed so that the inner peripheral surface 22, 32 is oriented downward, the laser light radiation device 120 is arranged on a lower side of the wire member 101, thereby being capable of favorably radiating the laser light to the inner peripheral surface 22, 32. At this time, for example, through driving of a mirror provided to the laser light radiation device 120, the dross-projecting portions 26, 36 having a staggered pattern and the recessed groove 27, 37 can be formed on the inner peripheral surface 22, 32. Moreover, not limited to the dross-projecting portions 26, 36 having the staggered pattern, the dross-projecting portions 26, 36 oriented in the same direction may be formed.

A fiber laser is suitable for the laser light radiation device 120. However, any laser light radiation device other than the fiber laser may be employed. For example, a YAG laser, a carbon dioxide laser, an argon laser, an excimer laser, a ruby laser, or a semiconductor laser may be employed. Moreover, through output adjustment for the laser light radiation device 120 and adjustment of a drive speed of the mirror provided to the laser light radiation device 120, dross-projecting portions 26, 36 having a suitable projection height can be formed. Moreover, through one-direction scanning (one shot) of the laser light radiation in a width direction of the segment 20, 30, a pair of dross-projecting portions 26, 36 can be formed.

When the laser light is to be radiated to the wire member 101, at a position of the inner peripheral surface of the segment 20, 30 opened by 20 degrees with respect to a center axis of the width of the segment 20, 30, with a projection height of from 4 μm to 25 μm, the laser light is radiated, in synchronization with a feeding speed of the wire member, to three or more positions at equal intervals per length which is a sum of a circumferential length of one segment 20, 30 and a cutting width given in the cutting process for the gap on the downstream side to. In such a manner, at the time of forming the segment 20, 30 by cutting, even when the dross-projecting portions 26, 36 at one position are cut at the time of forming the gap 21, 31, the pairs of dross-projecting portions 26, 36 at least at two positions can be left uncut.

With regard to the projection height of the dross-projecting portions 26, 36 at the position on the inner peripheral surface of the segment 20, 30 opened by 20 degrees with respect to the center axis of the width of the segment 20, 30 described above, not only the actual projection height of the dross-projecting portions 26, 36 but also an imaginary height is included. The imaginary height herein corresponds to a projection height of the dross-projecting portions 26, 36 which is originally assumed to be present in the case in which the actually overlaying dross-projecting portions 26, 36 are cut out by a grinder at a position of the inner peripheral surface or squeezed by a roller or the like in the subsequent step. The imaginary height of the dross-projecting portions 26, 36 can be calculated based on, for example, a ridge line height on both sides of the recessed cutout part.

For example, consideration is made of the case in which the function of the independent rotation of the segment 20, 30 is attained even when only the positions of the inner peripheral surface of the segment 20, 30 opened by 20 degrees with respect to the center axis of the width of the segment 20, 30 are partially cut so as to form the recessed shape. Moreover, it is assumed that a projection height of the dross-projecting portions 26, 36 is from 4 μm to 25 μm at a position of the inner peripheral surface of the segment 20, 30 opened by 20 degrees with respect to the center axis of the width of the segment 20, 30 before cutting. In this case, based on the shape (for example, shape of the ridge line) of the dross-projecting portions 26, 36 in the periphery of the recessed shape formed by cutting, the projection height of the original dross-projecting portions 26, 36 at the position of the inner peripheral surface of the segment 20, 30 opened by 20 degrees with respect to the center axis of the width of the segment 20, 30 can be virtually calculated. Thus, the projection height of the dross-projecting portions 26, 36 at the above-mentioned position includes both the actual projection height and an imaginary height calculated based on the shape in the periphery.

Moreover, the wire member 101 having been irradiated with the laser light is plastically processed into an annular shape (corresponding to the coiling step) by the coiling device 110 arranged on the downstream side, so that the dross-projecting portions 26, 36 are positioned on the inner periphery side of the annular shape. The coiling device 110 is a device configured to deform the wire member 101 into an annular shape, and the wire member 101 is brought into a state of being wound into a spiral shape.

After that, the wire member 101 wound into the spiral shape with the gap 21, 31 formed therein is cut along an axial direction of the wound object (wound body), thereby forming the segment 20, 30 (corresponding to the cutting step).

<Test Results>

Next, with regard to the pair of dross-projecting portions 26, 36 of the segment 20, 30 described above, a test for determination of whether or not the independent rotation can be prevented was conducted. In the following, description is made of results of the test. First, in the case in which carbon steel (hard steel wire) was employed as a material, evaluation was made on whether or not the independent rotation occurred, with various changes in projection height of the dross-projecting portions 26, 36 and inclination angle θ1 of the extending direction of the dross-projecting portions 26, 36 with respect to the axial direction (Y-direction) of the cylinder 1.

The segment 20, 30 used in this evaluation had an outer diameter of 89.0 mm, and a width W1 of the segment 20, 30 (axial direction; dimension in the Y-direction (see FIG. 11)) was 0.4 mm. Moreover, surface treatment was not performed on the inner peripheral surface 22, 32 of the segment 20, 30, and was left untreated. Moreover, the segment 20, 30 had two pairs of dross-projecting portions 26, 36. Moreover, an ear angle δs (see FIG. 1) of the expander spacer 40 for combining the segments 20 and 30 was 20 degrees. The projection height of the two pairs of the dross-projecting portions 26, 36 was measured at the position of the inner peripheral surface of the segment 20, 30. The opened angle was equal to the ear angle δs of the expander spacer 40 described above, and was an angle at a position at which the ear portion 43 of the expander spacer 40 and the segment inner peripheral surface were held in contact with each other. Moreover, the tension of the combination oil ring 10 was 10 N with a cylinder bore diameter ratio of 0.1 (N/mm). It was a low tension less than a half of the normal specification of from 0.2 to 0.3 (N/mm).

Figure 13:
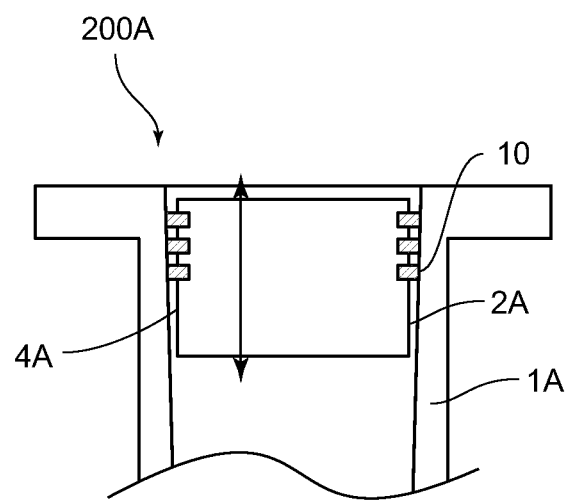
FIG. 13 is a view for illustrating a configuration of a single-cylinder motoring tester.

The combination oil ring 10 was placed on an oil ring groove 4A of a piston 2A of a single-cylinder motoring tester 200A as illustrated in FIG. 13, and the test was conducted. A stroke of the piston 2A was 70 mm, and the rotation number (reciprocation number) was 650 rpm. The test was conducted with the test time set to 30 minutes. Moreover, a cylinder 1A of the single-cylinder motoring tester was a tapered cylinder in which an upper opening side was wider than a lower side. An inner diameter on the opening side was 89.32 mm, and an inner diameter on the lower side was 89.00 mm. The tension amplitude of the combination oil ring 10 in the tapered cylinder was from 2 N to 10 N, and a lower limit was set at a level with no tension. In Table 1, "A" represents a case in which the independent rotation of the segment 20, 30 did not occur, and "B" represents a case in which the independent rotation of the segment 20, 30 occurred.

TABLE 1

| | Dross-projecting portion projection height (μm) | Dross-projecting portion inclination angle (°) | Segment material | Independent rotation evaluation result Not rotated - A Rotated - B |
|---|---|---|---|---|
| Example 1 | 4 | 45 | Hard steel | A |
| Example 2 | 4 | 30 | Hard steel | A |
| Example 3 | 4 | 15 | Hard steel | A |
| Example 4 | 4 | 5 | Hard steel | A |
| Example 5 | 4 | 0 | Hard steel | A |
| Example 6 | 10 | 45 | Hard steel | A |
| Example 7 | 10 | 30 | Hard steel | A |
| Example 8 | 10 | 15 | Hard steel | A |
| Example 9 | 10 | 5 | Hard steel | A |
| Example 10 | 10 | 0 | Hard steel | A |
| Example 11 | 20 | 45 | Hard steel | A |
| Example 12 | 20 | 30 | Hard steel | A |
| Example 13 | 20 | 15 | Hard steel | A |
| Example 14 | 20 | 5 | Hard steel | A |
| Example 15 | 20 | 0 | Hard steel | A |
| Example 16 | 25 | 45 | Hard steel | A |
| Example 17 | 25 | 30 | Hard steel | A |
| Example 18 | 25 | 15 | Hard steel | A |
| Example 19 | 25 | 5 | Hard steel | A |
| Example 20 | 25 | 0 | Hard steel | A |
| Comparative Example 1 | 3 | 45 | Hard steel | B |
| Comparative Example 2 | 3 | 30 | Hard steel | B |
| Comparative Example 3 | 3 | 15 | Hard steel | B |
| Comparative Example 4 | 3 | 5 | Hard steel | A |
| Comparative Example 5 | 3 | 0 | Hard steel | A |
| Comparative Example 6 | Inner periphery roughness Rz10 no laser | | Hard steel | B |

In Comparative Examples 1 to 5 in Table 1, the projection height of the pair of dross-projecting portions 26, 36 was 3 μm, and the inclination angles θ1 were 45 degrees (Comparative Example 1), 30 degrees (Comparative Example 2), 15 degrees (Comparative Example 3), 5 degrees (Comparative Example 4), and 0 degree (Comparative Example 5). Moreover, in Comparative Example 6, the dross-projecting portions 26, 36 were not present. Blasting was performed on the inner peripheral surface 22, 32, and its surface roughness Rz was 10 μm.

Moreover, in Examples 1 to 5 in Table 1, the projection height of the pair of dross-projecting portions 26, 36 was 4 μm, and the inclination angles θ1 were 45 degrees (Example 1), 30 degrees (Example 2), 15 degrees (Example 3), 5 degrees (Example 4), and 0 degree (Example 5). Moreover, in Examples 6 to 10 in Table 1, the projection height of the pair of dross-projecting portions 26, 36 was 10 μm, and the inclination angles θ1 were 45 degrees (Example 6), 30 degrees (Example 7), 15 degrees (Example 8), 5 degrees (Example 9), and 0 degree (Example 10).

Further, in Examples 11 to 15 in Table 1, the projection height of the pair of dross-projecting portions 26, 36 was 20 μm, and the inclination angles θ1 were 45 degrees (Example 11), 30 degrees (Example 12), 15 degrees (Example 13), 5 degrees (Example 14), and 0 degree (Example 15). Moreover, in Examples 16 to 20 in Table 1, the projection height of the pair of dross-projecting portions 26, 36 was 25 μm, and the inclination angles θ1 were 45 degrees (Example 16), 30 degrees (Example 17), 15 degrees (Example 18), 5 degrees (Example 19), and 0 degree (Example 20).

From the test results of Table 1, it was able to be concluded that the independent rotation of the segment 20, 30 was prevented when the projection height of the pair of dross-projecting portions 26, 36 was within the range of from 4 μm to 25 μm.

Next, the material of the segment 20, 30 was changed to stainless steel (stainless wire), and the test was conducted with the conditions which are the same as those given in Table 1 except for the material. That is, the test was conducted under the state in which all of the conditions were the same except that the material of the segment 20, 30 was changed to the stainless steel (stainless wire). The results of the test are shown in Table 2.

TABLE 2

| | Dross-projecting portion projection height (μm) | Dross-projecting portion inclination angle (°) | Segment material | Independent rotation evaluation result Not rotated - A Rotated - B |
|---|---|---|---|---|
| Example 31 | 4 | 45 | Stainless wire | A |
| Example 32 | 4 | 30 | Stainless wire | A |
| Example 33 | 4 | 15 | Stainless wire | A |
| Example 34 | 4 | 5 | Stainless wire | A |
| Example 35 | 4 | 0 | Stainless wire | A |
| Example 36 | 10 | 45 | Stainless wire | A |
| Example 37 | 10 | 30 | Stainless wire | A |
| Example 38 | 10 | 15 | Stainless wire | A |
| Example 39 | 10 | 5 | Stainless wire | A |
| Example 40 | 10 | 0 | Stainless wire | A |
| Example 41 | 20 | 45 | Stainless wire | A |
| Example 42 | 20 | 30 | Stainless wire | A |
| Example 43 | 20 | 15 | Stainless wire | A |
| Example 44 | 20 | 5 | Stainless wire | A |
| Example 45 | 20 | 0 | Stainless wire | A |
| Example 46 | 25 | 45 | Stainless wire | A |
| Example 47 | 25 | 30 | Stainless wire | A |
| Example 48 | 25 | 15 | Stainless wire | A |
| Example 49 | 25 | 5 | Stainless wire | A |
| Example 50 | 25 | 0 | Stainless wire | A |
| Comparative Example 31 | 3 | 45 | Stainless wire | B |
| Comparative Example 32 | 3 | 30 | Stainless wire | B |
| Comparative Example 33 | 3 | 15 | Stainless wire | B |
| Comparative Example 34 | 3 | 5 | Stainless wire | A |
| Comparative Example 35 | 3 | 0 | Stainless wire | A |
| Comparative Example 36 | Inner periphery roughness Rz10 no laser | | Stainless wire | B |

In Comparative Examples 31 to 35 in Table 2, the projection height of the pair of dross-projecting portions 26, 36 was 3 μm, and the inclination angles θ1 were 45 degrees (Comparative Example 31), 30 degrees (Comparative Example 32), 15 degrees (Comparative Example 33), 5 degrees (Comparative Example 34), and 0 degree (Comparative Example 35). Moreover, in Comparative Example 36, the dross-projecting portions 26, 36 were not present. Blasting was performed on the inner peripheral surface 22, 32, and its surface roughness Rz was 10 μm.

Moreover, in Examples 31 to 35 in Table 2, the projection height of the pair of dross-projecting portions 26, 36 was 4 μm, and the inclination angles θ1 were 45 degrees (Example 31), 30 degrees (Example 32), 15 degrees (Example 33), 5 degrees (Example 34), and 0 degree (Example 35). Moreover, in Examples 36 to 40 in Table 2, the projection height of the pair of dross-projecting portions 26, 36 was 10 μm, and the inclination angles θ1 were 45 degrees (Example 36), 30 degrees (Example 37), 15 degrees (Example 38), 5 degrees (Example 39), and 0 degree (Example 40).

Further, in Examples 41 to 45 in Table 2, the projection height of the pair of dross-projecting portions 26, 36 was 20 μm, and the inclination angles θ1 were 45 degrees (Example 41), 30 degrees (Example 42), 15 degrees (Example 43), 5 degrees (Example 44), and 0 degree (Example 45). Moreover, in Examples 46 to 50 in Table 2, the projection height of the pair of dross-projecting portions 26, 36 was 25 μm, and the inclination angles θ1 were 45 degrees (Example 46), 30 degrees (Example 47), 15 degrees (Example 48), 5 degrees (Example 49), and 0 degree (Example 50).

From the test results of Table 2, it was able to be concluded that the independent rotation of the segment 20, 30 was prevented when the projection height of the pair of dross-projecting portions 26, 36 was within the range of from 4 μm to 25 μm even in the case in which the material of the segment 20, 30 was stainless steel (stainless wire).

Next, the projection height of the dross-projecting portions was measured in the case in which the opening angle δ3 (measurement position) illustrated in FIG. 10 was variously changed. The measurement results are described below. First, in the case in which the carbon steel (hard steel wire) was used as the material, the inclination angles of the dross-projecting portions 26, 36 were variously changed, and the projection height of the dross-projecting portions 26, 36 was variously changed. Then, the height of the dross-projecting portions 26, 36 at the opening angles θ3 (measurement angles) for those cases was measured. At that time, the measurement was conducted with the measurement conditions which are the same as those given in Table 1 except that the opening angle δ3 was variously changed. The measurement results are shown in Table 3. In Table 3, the projection height of the dross-projecting portions 26, 36 was measured in the cases with the opening angles θ3 of 5 degrees, 10 degrees, 15 degrees, 20 degrees, 25 degrees, 30 degrees, and 35 degrees. Moreover, in Examples 1 to 20 and Comparative Examples 1 to 5 in Table 3, the measurement was conducted for the same items as those in Examples 1 to 20 and Comparative Examples 1 to 5 in Table 1, and hence the same numbers are allocated to Examples.

TABLE 3

| | Dross-projecting portion projection height (μm) | | | | | | |
|---|---|---|---|---|---|---|---|
| Measurement position θ3 (°) | 5 | 10 | 15 | 20 | 25 | 30 | 35 |
| Example 1 | 2 | 4 | 4 | 4 | 4 | 4 | 3 |
| Example 2 | 2 | 4 | 4 | 4 | 4 | 4 | 3 |
| Example 3 | 2 | 4 | 4 | 4 | 4 | 4 | 2 |
| Example 4 | 2 | 4 | 4 | 4 | 4 | 4 | 2 |
| Example 5 | 1 | 4 | 4 | 4 | 4 | 4 | 2 |
| Example 6 | 3 | 10 | 10 | 10 | 10 | 10 | 9 |
| Example 7 | 3 | 9 | 10 | 10 | 10 | 10 | 9 |
| Example 8 | 3 | 9 | 10 | 10 | 9 | 9 | 7 |
| Example 9 | 2 | 9 | 9 | 10 | 9 | 9 | 7 |
| Example 10 | 2 | 8 | 9 | 10 | 9 | 8 | 6 |
| Example 11 | 4 | 19 | 20 | 20 | 19 | 19 | 18 |
| Example 12 | 4 | 19 | 20 | 20 | 19 | 18 | 18 |
| Example 13 | 4 | 18 | 19 | 20 | 19 | 19 | 18 |
| Example 14 | 4 | 18 | 19 | 20 | 19 | 18 | 17 |
| Example 15 | 3 | 17 | 18 | 20 | 18 | 18 | 17 |
| Example 16 | 4 | 23 | 25 | 25 | 24 | 23 | 20 |
| Example 17 | 4 | 22 | 24 | 25 | 24 | 23 | 20 |
| Example 18 | 4 | 22 | 24 | 25 | 23 | 23 | 20 |
| Example 19 | 4 | 21 | 24 | 25 | 22 | 22 | 19 |
| Example 20 | 4 | 21 | 23 | 25 | 22 | 21 | 19 |
| Comparative Example 1 | 1 | 2 | 3 | 3 | 3 | 3 | 2 |
| Comparative Example 2 | 1 | 2 | 3 | 3 | 3 | 3 | 2 |
| Comparative Example 3 | 0 | 2 | 2 | 3 | 2 | 2 | 2 |
| Comparative Example 4 | 0 | 2 | 2 | 3 | 2 | 2 | 1 |
| Comparative Example 5 | 0 | 1 | 2 | 3 | 2 | 2 | 1 |

In Comparative Examples 1 to 5 in Table 3, measurement was performed on a projection height of the dross-projecting portions 26, 36 at each opening angle θ3 given in the case in which the projection height of the dross-projecting portions 26, 36 was 3 µm when the opening angle θ3 was 20 degrees. Comparative Example 1 is a measurement result given when the inclination angle θ1 of the dross-projecting portions 26, 36 was 45 degrees. Comparative Example 2 is a measurement result given when the inclination angle θ1 was 30 degrees. Moreover, Comparative Example 3 is a measurement result given when the inclination angle θ1 was 15 degrees. Comparative Example 4 is a measurement result given when the inclination angle θ1 was 5 degrees. Comparative Example 5 is a measurement result given when the inclination angle θ1 was 0 degree. In those Comparative Examples 1 to 5, the projection height of the dross-projecting portions 26, 36 was 3 µm at maximum.

Moreover, in Examples 1 to 5 in Table 3, measurement was performed on a projection height of the dross-projecting portions 26, 36 at each opening angle θ3 given in the case in which the projection height of the dross-projecting portions 26, 36 was 4 µm when the opening angle θ3 was 20 degrees. Among those, Example 1 is a measurement result given when the inclination angle θ1 of the dross-projecting portions 26, 36 was 45 degrees. Example 2 is a measurement result given when the inclination angle θ1 was 30 degrees. Moreover, Example 3 is a measurement result given when the inclination angle θ1 was 15 degrees. Example 4 is a measurement result given when the inclination angle θ1 was 5 degrees. Example 5 is a measurement result given when the inclination angle θ1 was 0 degree. In those Examples 1 to 5, the projection height of the dross-projecting portions 26, 36 was 4 µm at maximum.

Moreover, in Examples 6 to 10 in Table 3, measurement was performed on a projection height of the dross-projecting portions 26, 36 at each opening angle θ3 given in the case in which the projection height of the dross-projecting portions 26, 36 was 10 µm when the opening angle θ3 was 20 degrees. Among those, Example 6 is a measurement result given when the inclination angle θ1 of the dross-projecting portions 26, 36 was 45 degrees. Example 7 is a measurement result given when the inclination angle θ1 was 30 degrees. Moreover, Example 8 is a measurement result given when the inclination angle θ1 was 15 degrees. Example 9 is a measurement result given when the inclination angle θ1 was 5 degrees. Example 10 is a measurement result given when the inclination angle θ1 was 0 degree. In those Examples 6 to 10, the projection height of the dross-projecting portions 26, 36 was 10 µm at maximum.

Moreover, in Examples 11 to 15 in Table 3, measurement was performed on a projection height of the dross-projecting portions 26, 36 at each opening angle θ3 given in the case in which the projection height of the dross-projecting portions 26, 36 was 20 µm when the opening angle θ3 was 20 degrees. Among those, Example 11 is a measurement result given when the inclination angle θ1 of the dross-projecting portions 26, 36 was 45 degrees. Example 12 is a measurement result given when the inclination angle θ1 was 30 degrees. Moreover, Example 13 is a measurement result given when the inclination angle θ1 was 15 degrees. Example 14 is a measurement result given when the inclination angle θ1 was 5 degrees. Example 15 is a measurement result given when the inclination angle θ1 was 0 degree. In those Examples 11 to 15, the projection height of the dross-projecting portions 26, 36 was 20 µm at maximum.

Moreover, in Examples 16 to 20 in Table 3, measurement was performed on a projection height of the dross-projecting portions 26, 36 at each opening angle θ3 given in the case in which the projection height of the dross-projecting portions 26, 36 was 25 µm when the opening angle θ3 was 20 degrees. Among those, Example 16 is a measurement result given when the inclination angle θ1 of the dross-projecting portions 26, 36 was 45 degrees. Example 17 is a measurement result given when the inclination angle θ1 was 30 degrees. Moreover, Example 18 is a measurement result given when the inclination angle θ1 was 15 degrees. Example 19 is a measurement result given when the inclination angle θ1 was 5 degrees. Example 20 is a measurement result given when the inclination angle θ1 was 0 degree. In those Examples 16 to 20, the projection height of the dross-projecting portions 26, 36 was 25 µm at maximum.

In all of Examples 1 to 20 and Comparative Examples 1 to 5, the projection height of the dross-projecting portions 26, 36 was minimum when the opening angle θ3 was 5 degrees. This is because, in the coiling step performed by the coiling device 110 described above, a roller provided in the coiling device 110 squeezes the dross-projecting portions 26, 36 at the part with the opening angle θ3 of 5 degrees.

Next, the material of the segment 20, 30 was changed to stainless steel (stainless wire), and the test was conducted with the condition which are the same as those given in Table 3 except for the material. That is, the test was conducted under the state in which all of the conditions were the same except that the material of the segment 20, 30 was changed to the stainless steel (stainless wire). The results of the test are shown in Table 4. Moreover, in Examples 31 to 50 and Comparative Examples 31 to 35 in Table 4, the measurement was conducted for the same items as those in Examples 31 to 50 and Comparative Examples 31 to 35 in Table 2, and hence the same numbers are allocated to Examples.

TABLE 4

| | Dross-projecting portion projection height (µm) | | | | | | |
|---|---|---|---|---|---|---|---|
| Measurement position θ3 (°) | 5 | 10 | 15 | 20 | 25 | 30 | 35 |
| Example 31 | 2 | 4 | 4 | 4 | 4 | 4 | 3 |
| Example 32 | 2 | 4 | 4 | 4 | 4 | 4 | 3 |
| Example 33 | 2 | 4 | 4 | 4 | 4 | 4 | 2 |
| Example 34 | 2 | 4 | 4 | 4 | 4 | 4 | 2 |
| Example 35 | 1 | 4 | 4 | 4 | 4 | 4 | 2 |
| Example 36 | 3 | 10 | 10 | 10 | 10 | 10 | 9 |
| Example 37 | 3 | 9 | 10 | 10 | 10 | 10 | 9 |
| Example 38 | 3 | 9 | 10 | 10 | 9 | 9 | 7 |
| Example 39 | 2 | 9 | 9 | 10 | 9 | 9 | 7 |
| Example 40 | 2 | 8 | 9 | 10 | 9 | 8 | 6 |
| Example 41 | 4 | 19 | 20 | 20 | 19 | 19 | 18 |
| Example 42 | 4 | 19 | 20 | 20 | 19 | 18 | 18 |
| Example 43 | 4 | 18 | 19 | 20 | 19 | 19 | 18 |
| Example 44 | 4 | 18 | 19 | 20 | 19 | 18 | 17 |
| Example 45 | 3 | 17 | 18 | 20 | 18 | 18 | 17 |
| Example 46 | 4 | 23 | 25 | 25 | 24 | 23 | 20 |
| Example 47 | 4 | 22 | 24 | 25 | 24 | 23 | 20 |
| Example 48 | 4 | 22 | 24 | 25 | 23 | 23 | 20 |
| Example 49 | 4 | 21 | 24 | 25 | 22 | 22 | 19 |
| Example 50 | 4 | 21 | 23 | 25 | 22 | 21 | 19 |
| Comparative Example 31 | 1 | 2 | 3 | 3 | 3 | 3 | 2 |
| Comparative Example 32 | 1 | 2 | 3 | 3 | 3 | 3 | 2 |
| Comparative Example 33 | 0 | 2 | 2 | 3 | 2 | 2 | 2 |
| Comparative Example 34 | 0 | 2 | 2 | 3 | 2 | 2 | 1 |
| Comparative Example 35 | 0 | 1 | 2 | 3 | 2 | 2 | 1 |

In Table 4, Comparative Examples 31 to 35 correspond to Comparative Examples 1 to 5 in Table 3 in which the material was changed from the carbon steel (hard steel wire) to the stainless steel (stainless wire). In this case, in addition to the projection height of the dross-projecting portions 26, 36 given when the opening angle θ3 was 20 degrees as a reference, the projection height of the dross-projecting portions 26, 36 was substantially the same when the opening angle θ3 was 0 degree, 10 degrees, 15 degrees, 20 degrees, 25 degrees, 30 degrees, and 35 degrees.

In Table 4, Examples 31 to 50 correspond to Examples 1 to 20 in Table 3 in which the material was changed from the carbon steel (hard steel wire) to the stainless steel (stainless wire). Also in this case, in addition to the projection height of the dross-projecting portions 26, 36 given when the opening angle θ3 was 20 degrees as a reference, the projection height of the dross-projecting portions 26, 36 was substantially the same when the opening angle θ3 was 0 degree, 10 degrees, 15 degrees, 20 degrees, 25 degrees, 30 degrees, and 35 degrees.

In all of Examples 31 to 50 and Comparative Examples 31 to 35, the projection height of the dross-projecting portions 26, 36 was minimum when the opening angle θ3 was 5 degrees. This is because, in the coiling step performed by the coiling device 110 described above, a roller provided in the coiling device 110 squeezes the dross-projecting portions 26, 36 at the part with the opening angle θ3 of 5 degrees.

According to the measurement results of Examples 1 to 20 in Table 3 and Examples 31 to 50 in Table 4 above, it was found that, while the projection height of the dross-projecting portions 26, 36 was maximum at the part with the opening angle θ3 of 20 degrees, when the opening angle θ3 was in the range of from 10 degrees to 30 degrees, the dross-projecting portions 26, 36 were stably formed with the variation in the range of about 4 μm. Thus, it was found that, when the ear angle θs of the expander spacer 40 was within the range of from 10 degrees to 30 degrees, it was particularly effective for prevention of the independent rotation of the segment 20, 30. Moreover, in any of the cases of Examples 1 to 20 and 31 to 50, when the opening angle θ3 was in the range of from 10 degrees to 30 degrees, the projection height of the dross-projecting portions 26, 36 was within the range of from 4 μm to 25 μm.

Thus, in consideration of the results of Table 1 and Table 2 together, it was concluded that the independent rotation of the segment 20, 30 was prevented when the opening angle θ3 was within the range of from 10 degrees to 30 degrees.

<Actions and Effects>

With the segment 20, 30, the combination oil ring 10 having the configuration described above, and the manufacturing method for the segment 20, 30 described above, the following actions and effects can be attained. That is, a plurality of pairs of dross-projecting portions 26, 36 are formed on the inner peripheral surface 22, 32 of the segment 20, 30. Moreover, the pairs of dross-projecting portions 26, 36 have a projection height of from 4 μm to 25 μm at least at one position.

Therefore, while dealing with the reduction in tension of the combination oil ring 10, the independent rotation of the segment can be prevented.

Moreover, according to this embodiment, it is preferred that the pair of dross-projecting portions 26, 36 has a projection height of from 4 μm to 25 μm from the inner peripheral surface of the root of the dross-projecting portions 26, 36 at least at one position among positions on the inner peripheral surface of the segment 20, 30 opened within the range of from 10 degrees to 30 degrees with respect to a center axis of the width of the segment 20, 30.

When such a configuration is employed, the independent rotation of the segment can be favorably prevented.

Moreover, in this embodiment, it is preferred that the pair of dross-projecting portions 26, 36 be formed at two or more positions and that all of the pairs of dross-projecting portions 26, 36 be inclined in the first inclination direction with respect to the center axis direction (Y-direction) orthogonal to the circumferential direction of the segment 20, 30.

When such a configuration is employed, the pair of dross-projecting portions 26, 36 can easily be formed. Moreover, the independent rotation of the segment 20, 30 can be favorably prevented.

Moreover, in this embodiment, with respect to the center axis direction (Y-direction) orthogonal to the circumferential direction of the segment 20, 30, some pairs of dross-projecting portions 26, 36 are inclined in the first inclination direction, and some pairs of dross-projecting portions 26, 36 are inclined in the second inclination direction which is different from the first inclination direction. Moreover, it is preferred that the pair of dross-projecting portions 26, 36 inclined in the first inclination direction and the pair of dross-projecting portions 26, 36 inclined in the second inclination direction be adjacent to each other at portions other than the gap 21, 31 of the segment 20, 30, and that the adjacent pairs of dross-projecting portions 26, 36 be formed at least at two positions.

When such a configuration is employed, the independent rotation of the segment 20, 30 can be favorably prevented.

Moreover, in this embodiment, it is preferred that the pair of dross-projecting portions 26, 36 be continuously formed in a mounded form in the width direction of the segment 20, 30 and that the direction of the dross-projecting portions 26, 36 have an inclination angle of equal to or less than 45 degrees with respect to the center axis direction (Y-direction).

When such a configuration is employed, the independent rotation of the segment 20, 30 can be prevented more favorably. Moreover, as the pair of dross-projecting portions 26, 36 is continuously formed in the mounded form in the width direction of the segment 20, 30, even when the segment 20, 30 is moved or inclined inside the oil ring groove 4, the independent rotation of the segment 20, 30 can be prevented favorably.

Moreover, in this embodiment, it is preferred that the pair of dross-projecting portions 26, 36 be formed across the recessed groove 27, 37. When such a configuration is employed, through formation of the recessed groove 27, 37 by, for example, radiation of laser light and use of the steel having been present in the recessed groove 27, 37, the pair of dross-projecting portions 26, 36 can easily be formed.

Moreover, in this embodiment, it is preferred that the segment 20, 30 be made of carbon steel or stainless steel as a material. In this case, the independent rotation can be prevented favorably.

Moreover, in this embodiment, when the pitch between positions at which the pairs of dross-projecting portions 26, 36 can be formed is the pitch P2, and the pitch between the ear portions 43 of the expander spacer 40 is the pitch P1, it is preferred that P2=n×P1 be satisfied with "n" being a positive integer, and that the pairs of dross-projecting portions be formed at least at two positions among the positions determined by the pitch P2.

When such a configuration is employed, the dross-projecting portions 26, 36 can be reliably prevented from riding over the ear portion 43 (inclination surface 43a). Therefore, the independent rotation of the segment 20, 30 can be prevented more favorably.

Moreover, in this embodiment, when the pitch in a width center of the segment 20, 30 between positions at which the pairs of dross-projecting portions 26, 36 can be formed is the pitch P2, and the pitch between the ear portions 43 of the expander spacer 40 is the pitch P1, it is preferred that P2=n×P1+P1/2 be satisfied with "n" being an integer equal to or more than 0, and that the pairs of dross-projecting portions be formed at least at two positions among the positions determined by the pitch P2.

Also when such a configuration is employed, the dross-projecting portions 26, 36 can be reliably prevented from riding over the ear portion 43 (inclination surface 43a). Therefore, the independent rotation of the segment 20, 30 can be prevented more favorably.

Moreover, in this embodiment, when the segment 20, 30 is to be manufactured, in the wire member feeding step, the wire member 101 is drawn out from the coil master 100 around which the wire member 101 being the material for the segment 20, 30 is wound, and is fed to the downstream side. Moreover, in the laser light radiating step, on the downstream side in the feeding direction of the wire member 101 with respect to the coil master 100, the laser light is radiated to the wire member 101. And three or more dross-projecting portions 26, 36 are formed in synchronization with the feeding speed of the wire member 101 at equal intervals per length which is a sum of the circumferential length of one segment 20, 30 and a cutting width given at the time of forming the gap 21, 31 of the segment 20, 30 on the downstream side, where the projection height is from 4 μm to 25 μm from the surface being the inner peripheral surface of the root of the dross-projecting portions 26, 36 at least at one position. Moreover, in the coiling step on the downstream side of the laser light radiating step, the wire member 101 is plastically processed into an annular shape. Moreover, in the cutting step, the wire member 101 wound in a spiral shape is cut along an axial direction of the wound body obtained by winding the wire member 101, thereby forming the gap 21, 31.

When such steps are performed, those steps are employed as in-line step in the steps of the related art, thereby being capable of reliably forming the dross-projecting portions 26, 36 on the inner peripheral surface 22, 32 side of the segment 20, 30. Moreover, as compared to the case in which the blasting is performed on the inner peripheral surface 22, 32, the influence of deformation and distortion on the segment 20, 30 can be reduced.

Moreover, in this embodiment, it is preferred that, in the laser light radiating step, radiation of the laser light be performed along the intersecting direction intersecting the wire member feeding direction in the wire member feeding step, and the radiation of laser light be performed only in one direction extending from one side to another side in the intersecting direction.

When such a configuration is employed, the pair of dross-projecting portions 26, 36 can easily be formed. Moreover, the independent rotation of the segment 20, 30 can be favorably prevented.

Moreover, in this embodiment, it is preferred that, in the laser light radiating step, radiation of the laser light be performed along the intersecting direction intersecting the wire member feeding direction in the wire member feeding step, and that radiation of the laser light be performed in two directions in reciprocation in the intersecting direction.

Also when such a configuration is employed, the independent rotation of the segment 20, 30 can be favorably prevented.

Modification Example

In the above, description is made of the embodiments of the present invention. However, the present invention can be variously modified to modes other than those described above. Now, description is made of the modification.

In the above-mentioned embodiment, the combination oil ring 10 includes the pair of segments 20 and 30 and one expander spacer 40. The expander spacer in the embodiment of the present invention includes the ear portions 43 which are alternately arranged on the respective inner periphery sides of the upper pieces and lower pieces in the circumferential direction. However, there may be employed an expander spacer including ear portions which are arranged along the circumferential direction in pairs in the cylinder axial direction. Moreover, the combination oil ring may have a configuration in which one segment and one expander spacer are provided.

REFERENCE SIGNS LIST 1, 1A . . . cylinder, 2, 2A . . . piston, 3 . . . piston outer peripheral surface, 4, 4A . . . oil ring groove, 10 . . . combination oil ring, 20, 30 . . . segment, 21, 31 . . . gap, 22, 32 . . . inner peripheral surface, 23, 33 . . . outer peripheral surface, 26, 36 . . . dross-projecting portion, 27, 37 . . . recessed groove, 40 . . . expander spacer, 41 . . . upper piece, 42 . . . lower piece, 43 . . . ear portion, 43a . . . inclination surface, 43b . . . ear side surface, 44 . . . segment support portion, 45 . . . communication hole, 50 . . . placement jig, 51 . . . holding member, 60 . . . measurement device, 61 . . . laser radiation portion, 100 . . . coil master, 101 . . . wire member, 110 . . . coiling device, 120 . . . laser light radiation device, 200A . . . single-cylinder motoring tester

The invention claimed is:

1. A segment, which is slidable in an axial direction of a cylinder under a state in which an inner peripheral surface of the segment is pressed by ear portions formed along a circumferential direction of an expander spacer included in a combination oil ring for an internal combustion engine and an outer periphery side of the segment is pressed against an inner wall of the cylinder, the segment being made of metal as a material,
   wherein the inner peripheral surface of at least one segment has a recessed groove having a recessed shape,
   wherein dross-projecting portions having a mounded form are continuously formed along the recessed groove and on both sides of the recessed groove, and a plurality of pairs of dross-projecting portions each formed of the dross-projecting portions formed on the both sides are formed,
   wherein the pair of dross-projecting portions is formed in a manner that metal of the recessed groove is melted on the both sides and thereafter cooled and solidified,
   wherein the pair of dross-projecting portions has, at least at one position, a projection height of from 4 μm to 25 μm from the inner peripheral surface of the segment at a root of the dross-projecting portions, and
   wherein the pair of dross-projecting portions is formed so as to incline in a first inclination direction with respect to a center axis direction orthogonal to a circumferential direction of the segment.

2. The segment according to claim 1,
   wherein when the segment having an annular shape is placed on a horizontal plane so as to be inclined at least at one selected position at which a center axis of a width of the segment is inclined within a range of from 10 degrees to 30 degrees with respect to a vertical direction, on an inner peripheral surface in a cross section orthogonal to the circumferential direction of the segment and in a cross section grounded on the horizontal plane and being perpendicular to the horizontal plane, the dross-projecting portions at a highest position of the inner peripheral surface from the horizontal plane are formed so as to have a projection height of from 4 μm to 25 μm from the inner peripheral surface of the segment at the root of the dross-projecting portions.

3. The segment according to claim 1,
wherein the pairs of dross-projecting portions include a pair of dross-projecting portions inclined in a second inclination direction different from the first inclination direction with respect to the center axis direction orthogonal to the circumferential direction of the segment,
wherein the pair of dross-projecting portions inclined in the first inclination direction and the pair of dross-projecting portions inclined in the second inclination direction are adjacent to each other at a part other than a gap of the segment, and
wherein the adjacent pairs of dross-projecting portions are formed at least at two positions.

4. The segment according to claim 1,
wherein a direction in which the pair of dross-projecting portions continues in a mounded form forms an inclination angle of equal to or less than 45 degrees with respect to a center axis direction orthogonal to a circumferential direction of the segment.

5. The segment according to claim 1, wherein the segment is made of carbon steel or stainless steel as a material.

6. A combination oil ring, comprising:
an expander spacer having ear portions along a circumferential direction; and
at least one segment being slidable in an axial direction of a cylinder under a state in which an inner peripheral surface of the segment is pressed by the ear portions and an outer periphery side of the segment is pressed against an inner wall of the cylinder, the segment being made of metal as a material,
wherein the inner peripheral surface of the segment has dross-projecting portions having a mounded form that are continuously formed along a recessed groove and on both sides of the recessed groove, and a plurality of pairs of dross-projecting portions each formed of the dross-projecting portions formed on the both sides are formed,
wherein the pair of dross-projecting portions is formed in a manner that metal of the recessed groove is melted on the both sides and thereafter cooled and solidified,
wherein the pair of dross-projecting portions has, at least at one position, a projection height of from 4 μm to 25 μm from the inner peripheral surface of the segment at a root of the dross-projecting portions, and
wherein the pair of dross-projecting portions is formed so as to incline in a first inclination direction with respect to a center axis direction orthogonal to a circumferential direction of the segment.

7. The combination oil ring according to claim 6,
wherein, when the segment having an annular shape is held on a horizontal plane so as to be inclined at least at one selected position at which a center axis of a width of the segment is inclined within a range of from 10 degrees to 30 degrees with respect to a vertical direction, on an inner peripheral surface in a cross-section orthogonal to the circumferential direction of the segment and in a cross section grounded on the horizontal plane and being perpendicular to the horizontal plane, the dross-projecting portions at a highest position of the inner peripheral surface from the horizontal plane are formed so as to have a projection height of from 4 μm to 25 μm from the inner peripheral surface of the segment at the root of the dross-projecting portions.

8. The combination oil ring according to claim 6,
wherein the pairs of dross-projecting portions include a pair of dross-projecting portions inclined in a second inclination direction different from the first inclination direction with respect to the center axis direction orthogonal to the circumferential direction of the segment, and
wherein the pairs of the dross-projecting portions inclined in the first inclination direction and the pair of dross-projecting portions inclined in the second inclination direction are adjacent to each other at a part other than a gap of the segment, and
wherein the adjacent pairs of dross-projecting portions are formed at least at two positions.

9. The combination oil ring according to claim 6,
wherein a direction in which the pair of dross-projecting portions continues in a mounded form forms an inclination angle of equal to or less than 45 degrees with respect to the center axis direction orthogonal to a circumferential direction of the segment.

10. The combination oil ring according to claim 6,
wherein, when a pitch between positions at which the pairs of dross-projecting portions are formable is a pitch P2, and a pitch between the ear portions of the expander spacer is a pitch P1, $P2=n \times P1$ is satisfied with "n" being a positive integer, and
wherein the pairs of dross-projecting portions are formed at least at two positions among positions determined by the pitch P2.

11. The combination oil ring according to claim 8,
wherein, when a pitch in a width center of the segment between positions at which the pairs of dross-projecting portions are formable is a pitch P2, and a pitch between the ear portions of the expander spacer is a pitch P1, $P2=n \times P1+P1+P\frac{1}{2}$ is satisfied with "n" being an integer equal to or more than 0, and
wherein the pairs of dross-projecting portions are formed at least at two positions among positions determined by the pitch P2.

12. The combination oil ring according to claim 6,
wherein the segment is made of carbon steel or stainless steel as a material.

* * * * *